(12) United States Patent
Na et al.

(10) Patent No.: US 12,506,826 B2
(45) Date of Patent: Dec. 23, 2025

(54) ELECTRONIC DEVICE AND METHOD OF FABRICATING THE SAME

(71) Applicant: Samsung Display Co., LTD., Yongin-si (KR)

(72) Inventors: Hyunjae Na, Yongin-si (KR); Sungguk An, Yongin-si (KR); Chul Ho Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/381,906

(22) Filed: Oct. 19, 2023

(65) Prior Publication Data

US 2024/0223687 A1  Jul. 4, 2024

(30) Foreign Application Priority Data

Dec. 28, 2022 (KR) ........................ 10-2022-0186820

(51) Int. Cl.
  *H04M 1/02* (2006.01)
  *G06F 3/041* (2006.01)
  *G06F 3/044* (2006.01)

(52) U.S. Cl.
  CPC ...... *H04M 1/0266* (2013.01); *G06F 3/04164* (2019.05); *G06F 3/0443* (2019.05);
  (Continued)

(58) Field of Classification Search
  CPC ............ H04M 1/0266; H04M 1/0216; H04M 2250/22; G06F 3/04164; G06F 3/0443;
  (Continued)

(56) References Cited

U.S. PATENT DOCUMENTS 9,678,604 B2   6/2017  Lee
11,188,164 B2 * 11/2021  Eom ................... G06F 3/04164
(Continued)

FOREIGN PATENT DOCUMENTS

CN        114647330 A  *  6/2022  ........... G06F 1/1641
EP        3301550 A1  *  4/2018  ........... G06F 3/0412
(Continued)

OTHER PUBLICATIONS

Bohn, How Samsung beefed up its new folding phones: metal, tape, and a dab of goo, Aug. 12, 2021, pp. 1-16, retrieved Internet: URL: https://www.theverge.com/22619139/samsung-galaxy-z-fold-3-flip-screen-durability-waterproog-aluminium.

*Primary Examiner* — Ricardo Osorio
(74) *Attorney, Agent, or Firm* — CANTOR COLBURN LLP

(57) ABSTRACT

An electronic device includes a display panel including a base layer and a pixel, where the base layer includes a bending region which is bendable about an imaginary bending axis extending in a first direction, and a first non-bending region and a second-bending region which are spaced apart in a second direction from the bending region across the first non-bending region, and where the pixel is on the base layer to overlap the first non-bending region. The electronic device further includes a digitizer in contact with a lower portion of the base layer, a first driver chip connected to the pixel and on a portion of the base layer overlapping the second non-bending region, and a second driver chip connected to the digitizer and on a portion of the base layer overlapping the second non-bending region.

20 Claims, 19 Drawing Sheets

(52) U.S. Cl.
CPC . *H04M 1/0216* (2013.01); *G06F 2203/04103* (2013.01); *H04M 2250/22* (2013.01)

(58) Field of Classification Search
CPC ......... G06F 2203/04103; G06F 3/0412; G06F 2203/04102; G06F 3/0446; G06F 3/046; G09F 9/301; G09F 9/30
See application file for complete search history.

(56) References Cited

U.S. PATENT DOCUMENTS

| | | | | |
|---|---|---|---|---|
| 2014/0022187 | A1* | 1/2014 | Jeong | G06F 3/0446 345/173 |
| 2016/0179229 | A1* | 6/2016 | Ahn | G06F 3/041 345/173 |
| 2017/0123569 | A1 | 5/2017 | Kim et al. | |
| 2018/0136762 | A1* | 5/2018 | Jeong | G06F 3/0445 |
| 2018/0341290 | A1* | 11/2018 | Sim | G06F 1/1658 |
| 2022/0043538 | A1* | 2/2022 | Kishimoto | G06F 3/046 |
| 2022/0066583 | A1* | 3/2022 | Kishimoto | B32B 27/365 |
| 2022/0091632 | A1* | 3/2022 | Hong | H10K 59/40 |
| 2022/0091689 | A1* | 3/2022 | Kishimoto | G06F 1/1643 |
| 2022/0197440 | A1* | 6/2022 | Son | G06F 3/0418 |
| 2022/0350426 | A1* | 11/2022 | Kim | G06F 3/046 |
| 2022/0397972 | A1* | 12/2022 | Yoo | H10K 59/65 |

FOREIGN PATENT DOCUMENTS

| | | | |
|---|---|---|---|
| KR | 101581672 | B1 | 12/2015 |
| KR | 101750564 | B1 | 6/2017 |

\* cited by examiner

ELECTRONIC DEVICE AND METHOD OF FABRICATING THE SAME

This application claims priority to Korean Patent Application No. 10-2022-0186820, filed on Dec. 28, 2022, and all the benefits accruing therefrom under 35 U.S.C § 119, the content of which in its entirety is herein incorporated by reference in its entirety.

BACKGROUND

1. Field

Embodiments of the invention relate to an electronic device including a digitizer and a method of fabricating the digitizer, and more particularly, to a slim electronic device and a method of fabricating the slim electronic device.

2. Description of the Related Art

In the current information society, there is a great emphasis on electronic devices as visual information transmission media. The electronic device is activated with electrical signals applied thereto. The electronic device may include a display device to display images and a digitizer to detect external inputs.

The digitizer of the electronic device may include various sensing coils to be activated with electrical signals. A region where the sensing coils are activated corresponds to external signals.

SUMMARY

An embodiment of the invention provides an electronic device in which a digitizer is directly disposed below a display panel and a method of fabricating the electronic device.

According to an embodiment of the invention, an electronic device includes: a display panel that includes a base layer and a pixel, where the base layer includes a bending region which is bendable about an imaginary bending axis extending in a first direction, and a first non-bending region and a second-bending region which are spaced apart along a second direction intersecting the first direction with the bending region interposed therebetween, and where the pixel is on the base layer to overlap the first non-bending region; a digitizer in contact with a lower portion of the base layer: a first driver chip connected to the pixel and on a portion of the base layer overlapping the second non-bending region: and a second driver chip connected to the digitizer and on a portion of the base layer overlapping the second non-bending region.

In an embodiment, the base layer may include: a first layer in contact with the digitizer and including an organic material: and a second layer on the first layer and including an inorganic material.

In an embodiment, the digitizer may include: a lower layer: first loop coils on the lower layer: an upper layer on the lower layer and covering the first loop coils: second loop coils on the upper layer: connection lines connected to corresponding ones of the first loop coils and the second loop coils, respectively: and sensing pads connected to corresponding ones of the connection lines, respectively. In such an embodiment, the sensing pads may be connected to the second driver chip and exposed from the portion of the base layer overlapping the second non-bending region.

In an embodiment, the lower layer may include a first organic layer and a first inorganic layer on the first organic layer. In such an embodiment, the first loop coils may be on the first inorganic layer. In such an embodiment, the upper layer may include a second organic layer covering the first inorganic layer and a second inorganic layer on the second organic layer, where the second loop coils may be on the second inorganic layer.

In an embodiment, the first organic layer and the second organic layer may include a material the same as a material of the first layer. In such an embodiment, the first inorganic layer and the second inorganic layer may include a material the same as a material of the second layer.

In an embodiment, the electronic device may further include a panel protection layer including a base film including an organic material and a shield part including magnetic metal powder (MMP).

In an embodiment, the shield part may be on the base film.

In an embodiment, the magnetic metal powder may be within the base film.

In an embodiment, the first non-bending region of the display panel may include: a folding region which is foldable about an imaginary folding axis extending in the first direction: and non-folding regions which are spaced apart along the second direction with the folding region interposed therebetween. In such an embodiment, the electronic device may further include a lower plate below the panel protection layer. In such an embodiment, the lower plate may include non-folding parts which overlap corresponding non-folding regions, and a folding part which overlaps the folding region, the folding part disposed between the non-folding parts. In such an embodiment, a plurality of holes may be defined through the folding part of the lower plate to extend from top to bottom surfaces of the lower plate.

In an embodiment, the electronic device may further include an adhesion layer disposed between the panel protection layer and the lower plate. In such an embodiment, a groove may be defined in a portion of the adhesion layer overlapping the folding part. In such an embodiment, the groove may be formed by removal of at least a portion of the adhesion layer.

In an embodiment, in a state where the bending region is bent, the first driver chip and the second driver chip may overlap the first non-bending region.

In an embodiment, the digitizer may use an electromagnetic resonance (EMR) method to detect an external input.

In an embodiment, the electronic device may further include an input sensor on the display panel. In such an embodiment, the input sensor may include at least one sensing insulation layer and sensing electrodes which are insulated from each other. In such an embodiment, the input sensor may use a capacitive method to detect an external input.

In an embodiment, the electronic device may further include an upper film on the display panel, where the upper film may include a synthetic resin.

In an embodiment, the electronic device may further include a window on the upper film. In such an embodiment, the window may include a thin glass substrate, a window protection layer on the thin glass substrate, and a functional layer on the window protection layer. In such an embodiment, the functional layer may include at least one selected from a hard coating layer, an anti-fingerprint layer, and an antireflection layer.

According to an embodiment of the invention, a method of fabricating an electronic device includes: forming a lower layer on a work substrate: forming first loop coils and connection lines on the lower layer, where the connection lines are connected to corresponding first loop coils: forming an upper layer on the lower layer: forming second loop coils on the upper layer, where the second loop coils are connected to corresponding connection lines through contact holes defined in the upper layer: forming a base layer on the upper layer: and forming sensing pads on the base layer, where the sensing pads are connected to corresponding connection lines through contact holes defined in the upper layer and the base layer. In such an embodiment, each of the lower layer, the upper layer, and the base layer includes a first layer including an organic material and a second layer including an inorganic material, where the second layer is on the first layer.

In an embodiment, the method may further include: forming, on the base layer, a circuit layer including dielectric layers, transistors, and circuit lines connected to the transistors: forming, on the circuit layer, a light-emitting element layer including light-emitting elements connected to the transistors; and forming an encapsulation layer to cover the light-emitting element layer.

In an embodiment, the method may further include forming display pads on the base layer, where the display pads may be exposed from at least one of the dielectric layers and connected to corresponding circuit lines.

In an embodiment, the method may further include: connecting a first driver chip to the display pads; and connecting a second driver chip to the sensing pads.

In an embodiment, the connection lines, the first loop coils, and the second loop coils may be formed by one selected from a sputtering process, an electroless plating process, a trench process, and a transfer process.

DETAILED DESCRIPTION

Figure 1A:
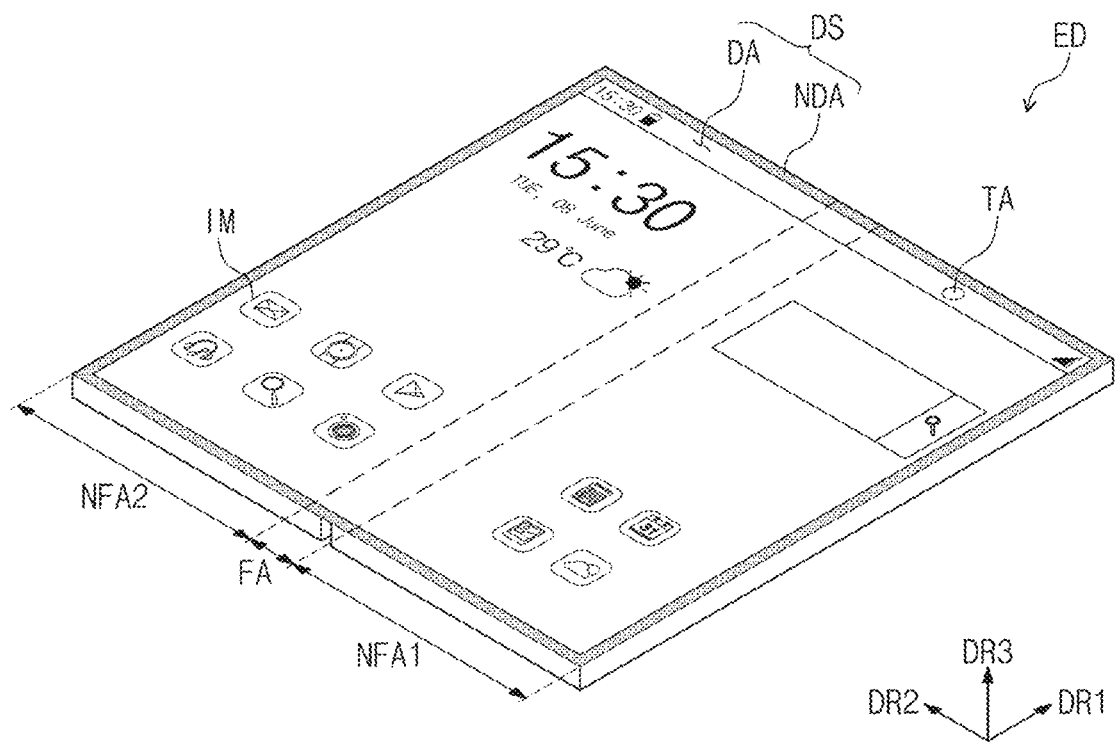
FIGS. 1A to 1C illustrate perspective views showing an electronic device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this description, when a certain component (or region, layer, portion, etc.) is referred to as being "on", "connected to", or "coupled to" other component(s), the certain component may be directly on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that, although the terms first, second, etc. may be used herein to describe various components, these components should not be limited by these terms. These terms are only used to distinguish one component from another component. For example, a first component could be termed a second component, and vice versa without departing from the scope of the invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 1B:
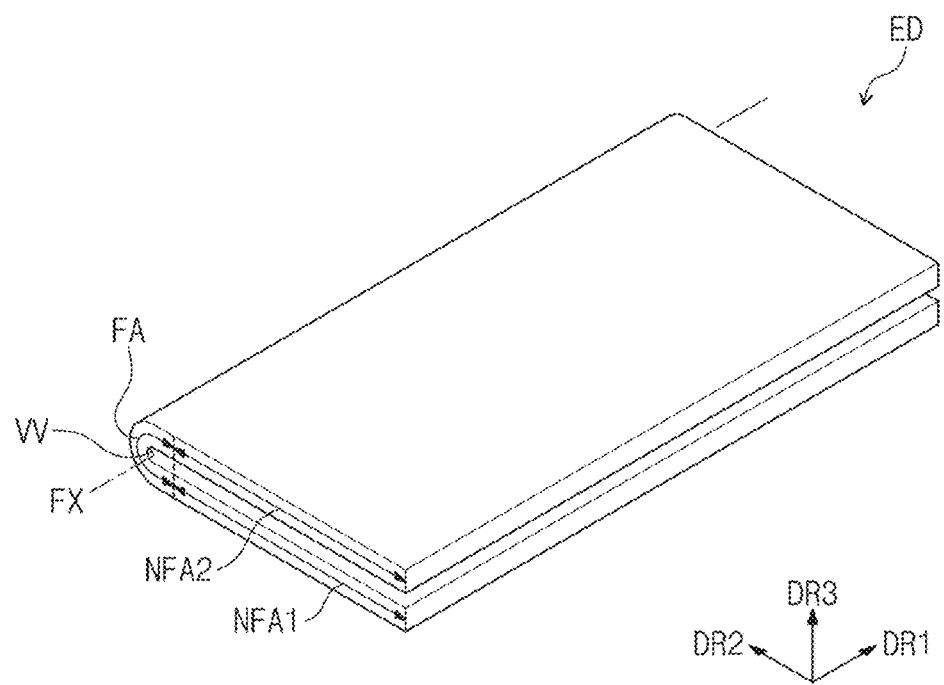
Figure 1C:
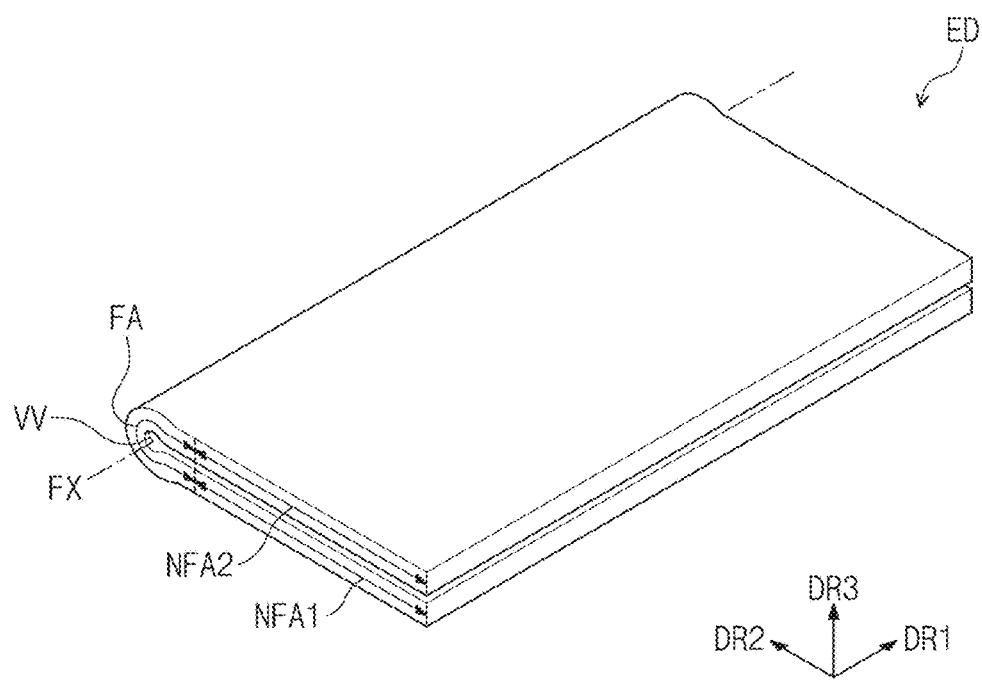

FIGS. 1A to 1C illustrate perspective views showing an electronic device according to an embodiment of the invention. FIG. 1A depicts an embodiment of an electronic device in an unfolding state, and FIGS. 1B and 1C depict an embodiment of an electronic device in a folding state.

Referring to FIGS. 1A to 1C, an electronic device ED according to an embodiment of the invention may include a display surface DS defined by a first direction DR1 and a second direction DR2 that intersects the first direction DR1. The electronic device ED may display an image IM to users through the display surface DS.

The display surface DS may include a display region DA and a non-display region NDA around the display region DA. The display region DA may display the image IM, and the non-display region NDA may not display the image IM. The non-display region NDA may surround the display region DA. The invention, however, is not limited thereto, and the display region DA and the non-display region NDA may be changed or modified in shape.

The display surface DS may include a sensing region TA. The sensing region TA may be a partial section of the display region DA. The sensing region TA may have an optical transmittance greater than that of another section of the display region DA. In the following description, another section other than the sensing region TA of the display region DA may be defined as a normal display region.

An optical signal, such as visible light or infrared light, may be transmitted toward an outside through the sensing region TA. The electronic device ED may use visible light that passes through the sensing region TA to capture an external image or may use infrared light to determine proximity of external substances. FIG. 1A depicts by way of example an embodiment where a single sensing region TA is defined, but not being limited thereto. Alternatively, the sensing region TA may be provided in plural.

In the following description, a third direction DR3 may be defined as a direction that substantially vertically intersects a plane defined by the first direction DR1 and the second direction DR2. The third direction DR3 may serve as a reference to differentiate front and rear surfaces (top and bottom surfaces) of each component. In this description, the phrase "when viewed on a plane" may indicate the meaning of "when viewed in the third direction DR3." The third direction DR3 may be a thickness direction of the electronic device ED.

The electronic device ED may include a folding region FA and a plurality of non-folding regions NFA1 and NFA2. The non-folding regions NFA1 and NFA2 may include a first non-folding region NFA1 and a second non-folding region NFA2. The first non-folding region NFA1 and the second non-folding region NFA2 may be spaced apart in the second direction DR2 from each other across the folding region FA. In an embodiment of the invention, among components included in the electronic device ED, some components that overlap the folding region FA may fold at the same time when the electronic device ED folds.

In an embodiment, as illustrated in FIG. 1B, the folding region FA may fold about a folding axis FX parallel to the first direction DR1. The folding region FA may have a certain curvature and a curvature radius VV. A distance between the first non-folding region NFA1 and the second non-folding region NFA2 may be substantially the same as twice the curvature radius VV. According to an embodiment, the electronic device ED may fold in an in-folding fashion such that the first non-folding region NFA1 and the second non-folding region NFA2 may face each other not to allow the display surface DS to be outwardly exposed.

In an embodiment, as illustrated in FIG. 1C, a distance between the first non-folding region NFA1 and the second non-folding region NFA2 may be less than twice the curvature radius VV. Thus, in a folding state, there may be a reduction in spacing between the first non-folding region NFA1 and the second non-folding region NFA2. Accordingly, the electronic device ED may become slim in the folding state.

The invention, however, is not limited thereto, and the electronic device ED may fold in an out-folding fashion such that the display surface DS may be externally exposed. In an embodiment of the invention, the electronic device ED may be configured to reciprocally repeat an in-folding operation and/or an out-folding operation from an unfolding operation, but the invention is not limited thereto. In an embodiment of the invention, the electronic device ED may be configured to select one of an unfolding operation, an in-folding operation, and an out-folding operation.

Figure 2A:
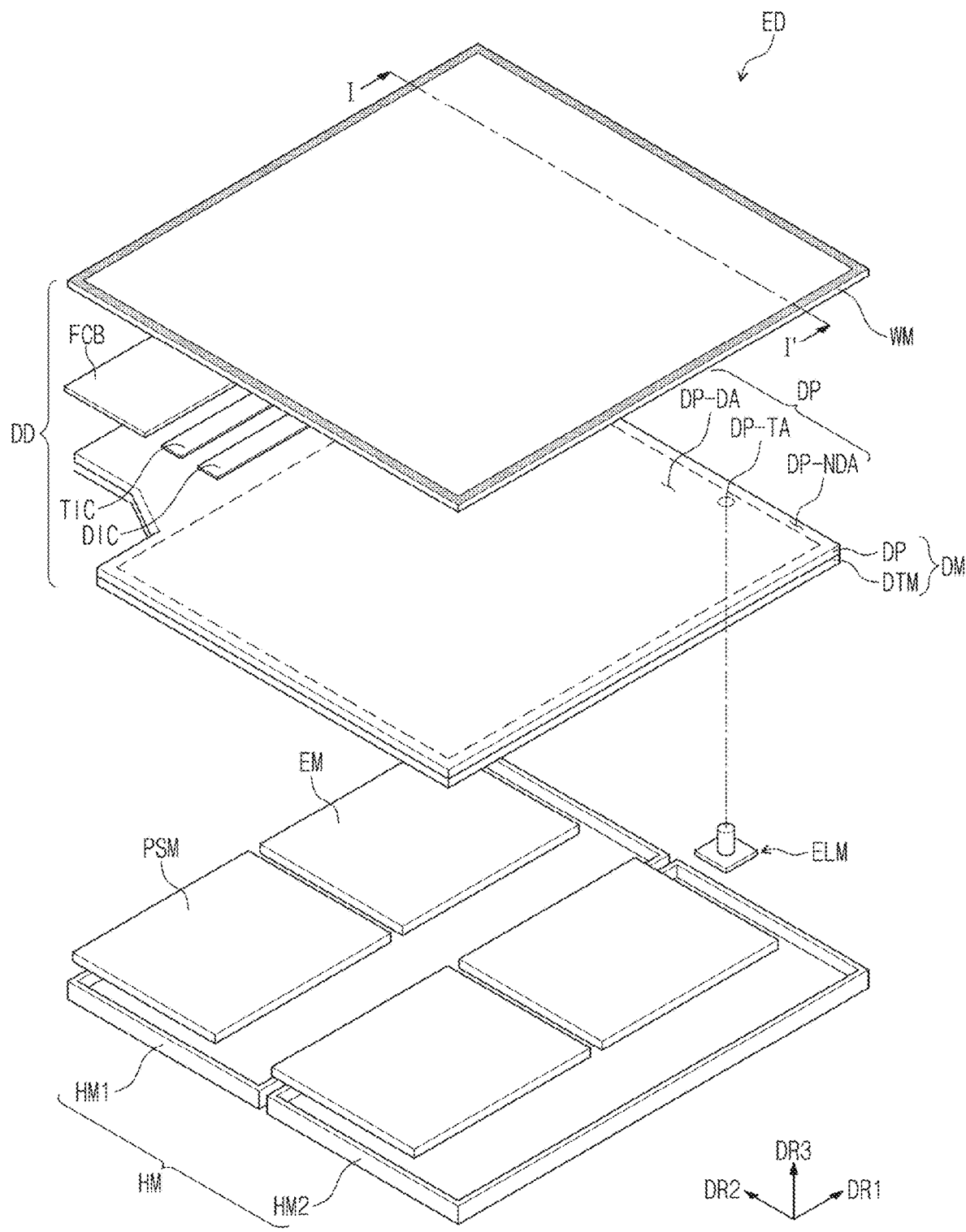
FIG. 2A illustrates an exploded perspective view showing an electronic device according to an embodiment of the invention.
Figure 2B:
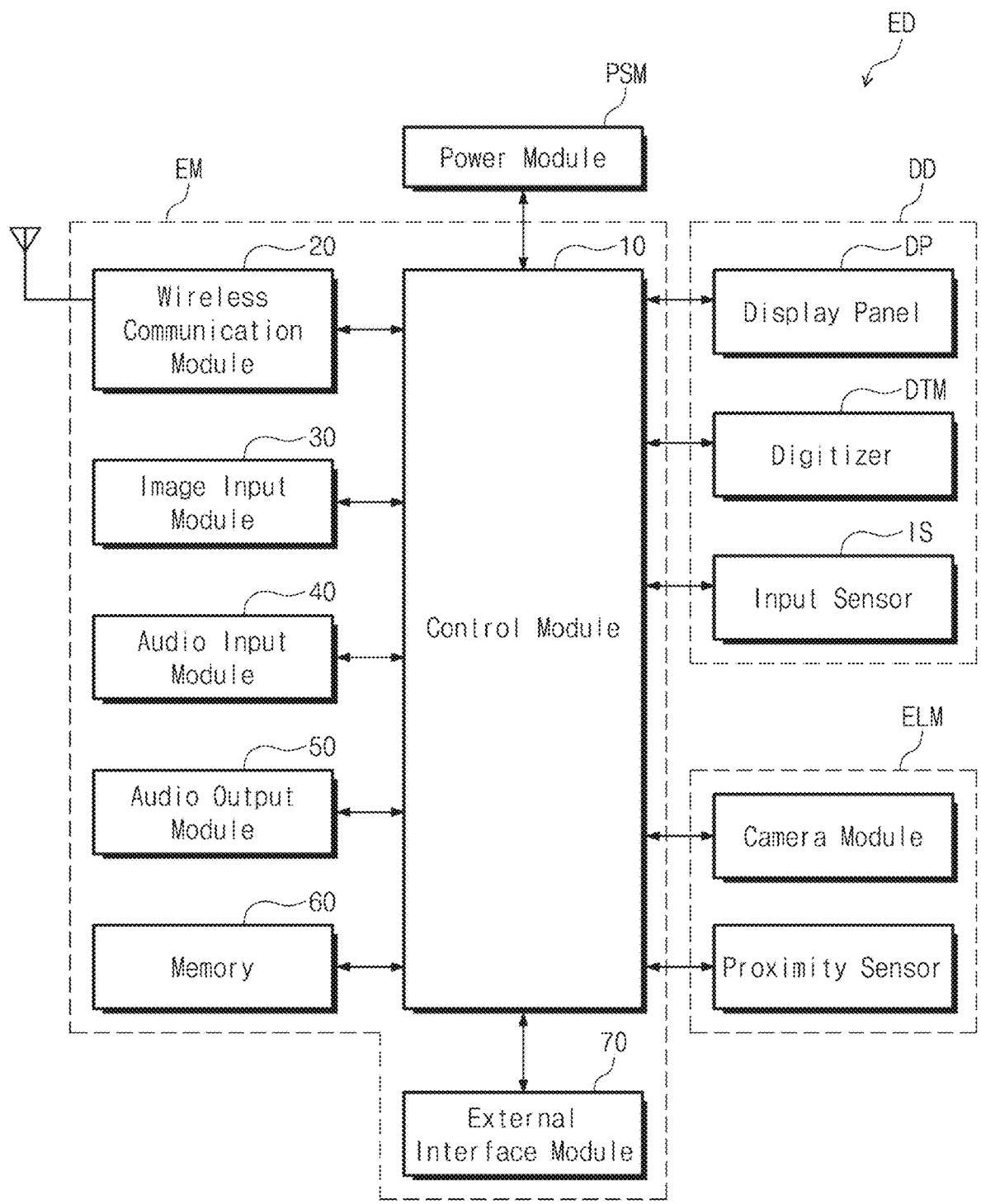
FIG. 2B illustrates a block diagram showing an electronic device according to an embodiment of the invention.

FIG. 2A illustrates an exploded perspective view showing an electronic device according to an embodiment of the invention. FIG. 2B illustrates a block diagram showing an electronic device according to an embodiment of the invention.

Referring to FIGS. 2A and 2B, an embodiment of the electronic device ED may include an electronic panel DD, an electronic module EM, an electro-optical module ELM, a power module PSM, and a housing HM. Although not separately shown, the electronic device ED may further include a mechanical structure (e.g., hinge) for controlling a folding operation of the electronic panel DD.

The electronic panel DD may generate images and detect external inputs. The electronic panel DD may include a window WM and a display module DM. The window WM may provide a front surface of the electronic device ED. The window WM will be further described in detail below.

The display module DM may include a display panel DP and a digitizer DTM. FIG. 2A depicts only the display panel DP and the digitizer DTM among stacked components of the display module DM, for convenience of illustration, but not being limited thereto. Alternatively, the display module DM may further include a plurality of other components disposed on the display panel DP. The stack structure of the display module DM will be further described in detail below.

A kind of the display panel DP according to an embodiment of the invention is not particularly limited thereto. In an embodiment, for example, the display panel DP may be an emissive display panel, such as an organic light-emitting display panel or a quantum-dot light-emitting display panel.

The display panel DP may include a display region DP-DA and a non-display region DP-NDA that correspond to the display region (see DA of FIG. 1A) and the non-display region (see NDA of FIG. 1A). In this description, the phrase "a region/part corresponds to a region/part" may mean "a region/part overlaps a region/part", which interpretation is not limited to the meaning of "a region/part has the same area as that of a region/part."

The display panel DP may include a sensing region DP-TA (or first non-bending region) that corresponds to the sensing region TA of FIG. 1A. The sensing region DP-TA may have resolution less than that of the display region DP-DA (or second non-bending region). The sensing region DP-TA will be further described in detail below.

The digitizer DTM according to an embodiment of the invention may be directly disposed below the display panel DP. The digitizer DTM and the display panel DP may be formed through a series of processes. In this description, the expression "directly disposed on/below" may mean that no third component is disposed between the digitizer DTM and the display panel DP. In an embodiment, for example, no adhesion layer may be separately disposed between the digitizer DTM and the display panel DP.

The digitizer DTM may detect an input by an electromagnetic pen. The digitizer DTM may use electromagnetic resonance (EMR) to detect an input by an electromagnetic pen.

According to an embodiment of the invention, a first driver chip DIC and a second driver chip TIC may be disposed on the non-display region DP-NDA of the display panel DP. The first driver chip DIC may be connected to pixels (see PX of FIG. 3A) included in the display panel DP. The first driver chip DIC may include driving elements, such as data driving circuit, for driving pixels (see PX of FIG. 3A) of the display panel DP. The second driver chip TIC may be connected to the digitizer DTM. The second driver chip TIC may include a driving circuit for processing signals that are detected in the digitizer DTM.

FIG. 2A depicts an embodiment having a structure in which the first driver chip DIC and the second driver chip TIC are mounted on the display panel DP, but the invention is not limited thereto. In an embodiment, for example, at least one selected from the first driver chip DIC and the second driver chip TIC may be mounted on a flexible circuit board FCB.

The flexible circuit board FCB may be combined with the non-display region DP-NDA of the display panel DP. The flexible circuit board FCB may be connected to a main circuit board. The main circuit board may be one electronic component included in the electronic module EM.

In an embodiment, as illustrated in FIG. 2B, the electronic panel DD may further include an input sensor IS. The input sensor IS may detect user's inputs. The input sensor IS of capacitive type may be disposed on the display panel DP. According to an embodiment of the invention, a series of processes may be employed to form the input sensor IS on the display panel DP. Therefore, a series of processes may be used to form the digitizer DTM, the display panel DP, and the input sensor IS that are included in the electronic panel DD.

In an embodiment, the electronic module EM may include a control module 10, a wireless communication module 20, an image input module 30, an audio input module 40, an audio output module 50, a memory 60, and an external interface module 70. The electronic module EM may include a main circuit board, and the modules may be mounted on the main circuit board or may be electrically connected through a flexible circuit board to the main circuit board. The electronic module EM may be electrically connected to the power module PSM.

The electronic module EM may be disposed on each of a first housing HM1 and a second housing HM2, and the power module PSM may be disposed on each of the first housing HM1 and the second housing HM2. Although not shown, the electronic module EM disposed on the first housing HM1 and the electronic module EM disposed on the second housing HM2 may be electrically connected to each other through a flexible circuit board.

The control module 10 may control an overall operation of the electronic device ED. In an embodiment, for example, the control module 10 may activate or deactivate the electronic panel DD in response to user's inputs. In response to user's inputs, the control module 10 may control the image input module 30, the audio input module 40, and the audio output module 50. The control module 10 may include at least one microprocessor.

The wireless communication module 20 may use Bluetooth or WiFi communication to transceive (i.e., transmit or receive) wireless signals with other terminals. The wireless communication module 20 may use an ordinary communication system to transceive voice signals. The wireless communication module 20 may include a plurality of antenna modules.

The image input module 30 may process and convert image signals into image data capable of being displayed on the electronic panel DD. In a record module or a voice recognition mode, the audio input module 40 may receive external audio signals through a microphone and may convert the received audio signals into electrical voice data. The audio output module 50 may convert and output audio data received from the wireless communication module 20 or stored in the memory 60.

The external interface module 70 may serve as an interface connected to an external charger, a wire/wireless data port, a card socket (e.g., memory card, SIM/UIM card).

The power module PSM may supply power required for the overall operation of the electronic device ED. The power module PSM may include an ordinary battery apparatus.

The electro-optical module ELM may be an electronic component that outputs or receives optical signals. The electro-optical module ELM may include a camera module and/or a proximity sensor. The camera module may use the sensing region DP-TA to capture external images. The electro-optical module ELM may be disposed below the electronic panel DD and may overlap the sensing region DP-TA.

The housing HM may be combined with the window WM to accommodate other modules described above. In an embodiment, as shown in FIG. 2A, the housing HM may include the first and second housings HM1 and HM2 that are separated from each other, but the invention is not limited thereto. The electronic device ED according to an embodiment may further include a hinge structure for connecting the first and second housings HM1 and HM2 to each other.

Figure 3A:
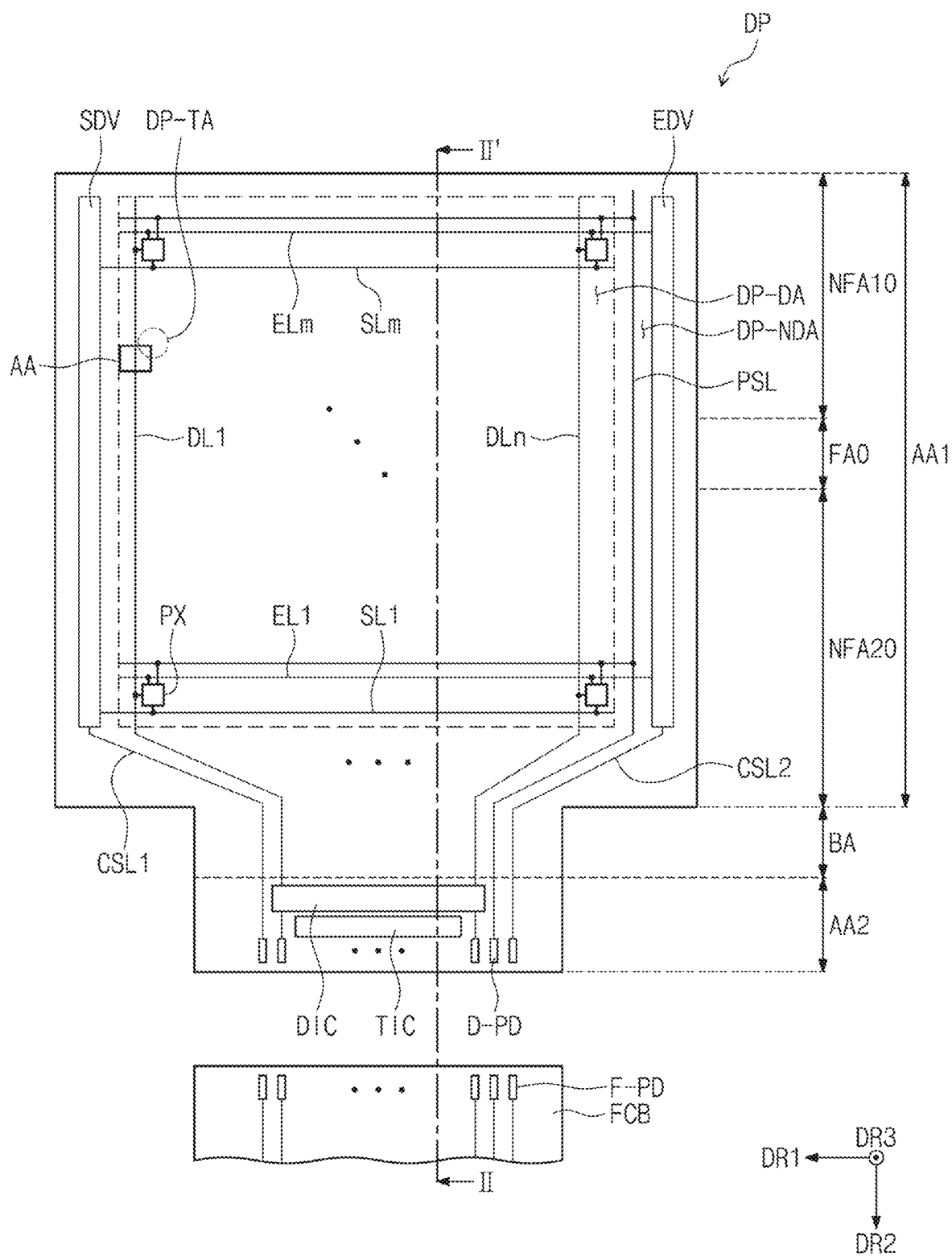
FIG. 3A illustrates a plan view showing a display panel according to an embodiment of the invention.
Figure 3B:
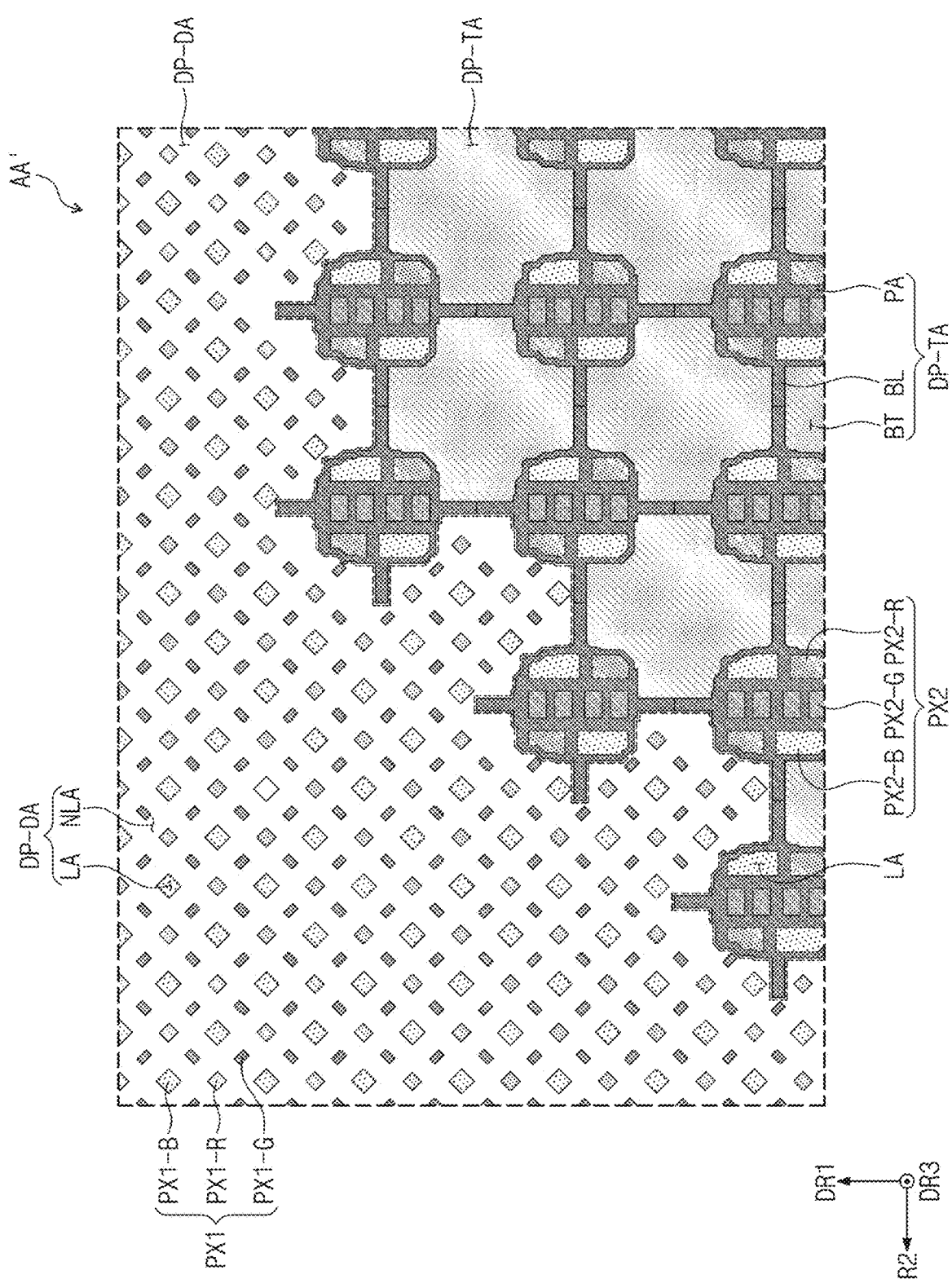
FIG. 3B illustrates an enlarged view showing a partial section of FIG. 3A.

FIG. 3A illustrates a plan view showing a display panel according to an embodiment of the invention. FIG. 3B illustrates an enlarged view showing a partial section of FIG. 3A.

Referring to FIG. 3A, an embodiment of the display panel DP may include a display region DP-DA and a non-display region DP-NDA around the display region DP-DA. The display region DP-DA and the non-display region DP-NDA may be divided based on whether a pixel PX is present or not. A plurality of pixels PX may be disposed on the display region DP-DA. A scan driver SDV, a data driver, and an emission driver EDV may be disposed on the non-display region DP-NDA. The data driver may be a circuit configured in the first driver chip DIC depicted in FIG. 3A.

The display panel DP may include a first non-bending region AA1, a second non-bending region AA2, and a bending region BA that are divided from each other in the second direction DR2. The second non-bending region AA2 and the bending region BA may be a portion of the non-display region DP-NDA. The bending region BA may be disposed between the first non-bending region AA1 and the second non-bending region AA2.

The first non-bending region AA1 may correspond to the display surface DS of FIG. 1A. The first non-bending region AA1 may include a first non-folding region NFA10, a second non-folding region NFA20, and a folding region FA0. The first non-folding region NFA10, the second non-folding region NFA20, and the folding region FA0 may respectively correspond to the first non-folding region NFA1, the second non-folding region NFA2, and the folding region FA of FIGS. 1A to 1C.

A length in the first direction DR1 of the bending region BA and the second non-bending region AA2 may be less than that of the first non-bending region AA1. The bending region BA, whose length in the first direction DR1 is relatively small, may easily bend about a bending axis that extends in the first direction DR1.

According to an embodiment of the invention, the first driver chip DIC and the second driver chip TIC may be disposed on the second non-bending region AA2 of the non-display region DP-NDA.

The display panel DP may include a plurality of pixels PX, a plurality of scan lines SL1 to SLm, a plurality of data lines DLI to DLn, a plurality of emission lines ELI to ELm, first and second control lines CSL1 and CSL2, a power line PSL, and a plurality of pads D-PD. Here, "m" and "n" are natural numbers. The pixels PX may be connected to the scan lines SL1 to SLm, the data lines DLI to DLn, and the emission lines ELI to ELm.

The scan lines SL1 to SLm may extend in the second direction DR2 and may be connected to the scan driver SDV. The data lines DLI to DLn may extend in the second direction DR2 and may be connected through the bending region BA to the first driver chip DIC. The emission lines ELI to ELm may extend in the first direction DR1 and may be connected to the emission driver EDV.

The power line PSL may include a segment that extends in the second direction DR2 and a segment that extends in the first direction DR1. The segment extending in the first direction DR1 may be disposed in a different layer from that of the segment extending in the second direction DR2. The segment extending in the second direction DR2 of the power line PSL may extend through the bending region BA toward the second non-bending region AA2. The power line PSL may provide the pixels PX with a first voltage.

The first control line CSL1 may be connected to the scan driver SDV, and may extend through the bending region BA toward a lower end of the second non-bending region AA2. The second control line CSL2 may be connected to the emission driver EDV, and may extend through the bending region BA toward the lower end of the second non-bending region AA2.

When viewed on a plane, the display pads D-PD may be disposed adjacent to the lower end of the second non-bending region AA2. The first driver chip DIC, the power line PSL, the first control line CSL1, and the second control line CSL2 may be connected to the display pads D-PD. Substrate pads F-PD included in the flexible circuit board FCB may be electrically connected to corresponding display pads D-PD through an anisotropic conductive layer.

Referring to FIG. 3B, the sensing region DP-TA (or first non-bending region) may have optical transmittance and resolution that are respectively greater and less than optical transmittance and resolution of the display region DP-DA (or second non-bending region). The optical transmittance and the resolution may be measured per unit area. An occupying ratio of light-shield structures per unit area may be less in sensing region DP-TA than in the display region DP-DA. The light-shield structures may include a conductive pattern of a circuit layer, an electrode of a light-emitting element, and a light-shield pattern which will be described in detail below.

The resolution per unit area may be less in sensing region DP-TA than in the display region DP-DA. The number of pixels per unit area (or a same area) may be less in sensing region DP-TA than in the display region DP-DA.

As illustrated in FIG. 3B, a first pixel PX1 may be disposed on the display region DP-DA, and a second pixel PX2 may be disposed on the sensing region DP-TA. When comparing areas of pixels that provide the same color, the first pixel PX1 and the second pixel PX2 may have their emission areas different from each other. The first pixel PX1 and the second pixel PX2 may have arrangements different from each other.

FIG. 3B depicts, by way of representative example, emission regions LA of the first pixel PX1 and the second pixel PX2. Each of the emission regions LA may be defined to indicate a region where an anode of a light-emitting element is exposed by a pixel definition layer. In the display region DP-DA, a non-emission region NLA may be disposed between the emission regions LA.

The first pixel PX1 may include a first color pixel PX1-R, a second color pixel PX1-G, and a third color pixel PX1-B, and the second pixel PX2 may include a first color pixel PX2-R, a second color pixel PX2-G, and a third color pixel PX2-B. The first color pixel PX1-R and the first color pixel PX2-R may each provide (or emit) red light, the second color pixel PX1-G and the second color pixel PX2-G may each provide green light, and the third color pixel PX1-B and the third color pixel PX2-B may each provide blue light.

The sensing region DP-TA may include a pixel region PA, a wiring region BL, and a transmission region BT. The second pixel PX2 may be disposed on the pixel region PA.

FIG. 3B shows an embodiment where one pixel region PA includes two first color pixels PX2-R, four second color pixels PX2-G, and two third color pixels PX2-B, but the invention is not limited thereto.

A light-shield pattern, a signal line, or a conductive pattern related to the second pixel PX2 may be disposed on the pixel region PA and the wiring region BL. The light-shield pattern may be a metal pattern, and may substantially overlap the pixel region PA and the wiring region BL. The pixel region PA and the wiring region BL may be a non-transmission region.

The transmission region BT may be a region through which an optical signal substantially passes. As the second pixel PX2 is not disposed on the transmission region BT, a conductive pattern, a signal line, or a light-shield pattern may be disposed on the transmission region BT. Therefore, the transmission region BT may increase an optical transmittance of the sensing region DP-TA. According to an embodiment, the electro-optical module ELM described above with reference to FIG. 2A may overlap the sensing region DP-TA whose optical transmittance is high, which may result in an increase in receiving efficiency of optical signals.

Figure 4:
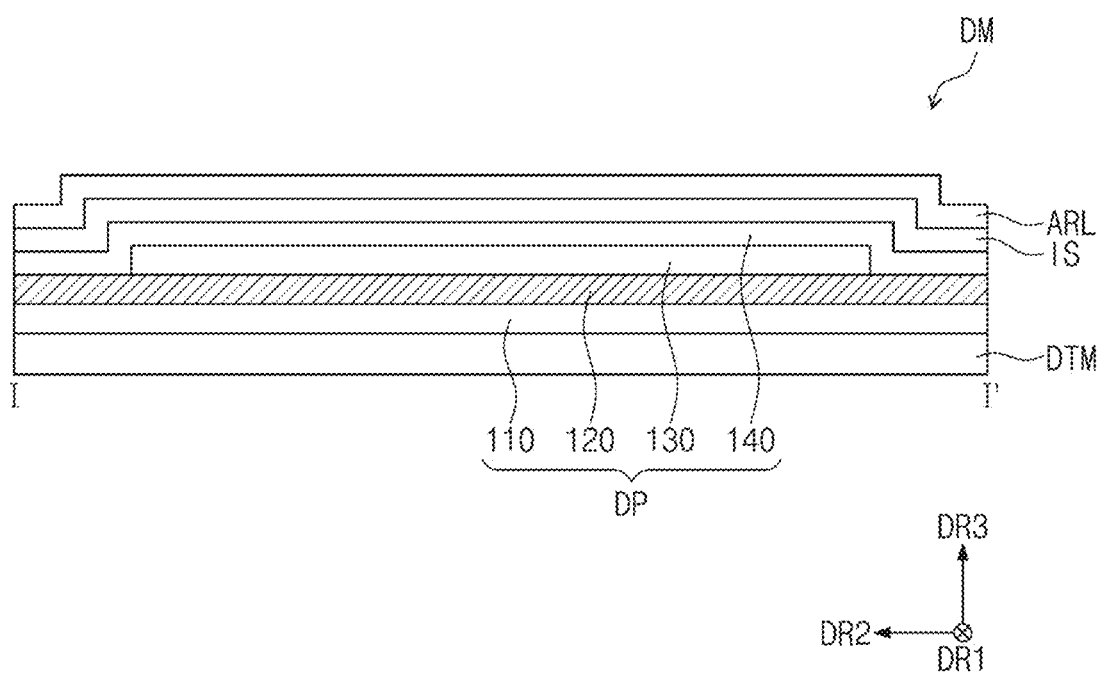
FIG. 4 illustrates a cross-sectional view taken along line I-I' of FIG. 2A.

FIG. 4 illustrates a cross-sectional view taken along line I-I' of FIG. 2A.

Referring to FIG. 4, an embodiment of the display module DM may include a digitizer DTM, a display panel DP, an input sensor IS, and an antireflection layer ARL. The display panel DP may be directly disposed on the digitizer DTM. The digitizer DTM will be described in detail below.

In an embodiment, the display panel DP may include a base layer 110, a circuit layer 120, a light-emitting element layer 130, and an encapsulation layer 140.

The base layer 110 may provide a base surface on which the circuit layer 120 is disposed. The base layer 110 may be a flexible substrate that is bendable, foldable, or rollable. In an embodiment, the base layer 110 may be a glass substrate, a metal substrate, or a polymer substrate. The invention, however, is not limited thereto, and the base layer 110 may be an inorganic layer, an organic layer, or a composite material layer.

The base layer 110 may have a multi-layered structure. In an embodiment, for example, the base layer 110 may include a synthetic resin layer, a multi-layered inorganic layer, or a single-layered inorganic layer. The synthetic resin layer may include a polyimide-based resin, but the invention is not limited thereto.

The circuit layer 120 may be disposed on the base layer 110. The circuit layer 120 may include dielectric layers, transistors each including a semiconductor pattern, circuit lines connected to the transistors, and conductive patterns.

The light-emitting element layer 130 may be disposed on the circuit layer 120. The light-emitting element layer 130 may include a light-emitting element. In an embodiment, for example, the light-emitting element may include an organic light-emitting material, an inorganic light-emitting material, an organic-inorganic light-emitting material, a quantum dot, a quantum rod, a micro-light emitting diode (LED), or a nano-LED.

The encapsulation layer 140 may be disposed on the light-emitting element layer 130. The encapsulation layer 140 may protect the light-emitting element layer 130 against moisture, oxygen, and foreign substances such as dust particles. The encapsulation layer 140 may include at least one inorganic layer. The encapsulation layer 140 may include a stack structure in which an inorganic layer, an organic layer, and an inorganic layer are stacked on each other.

The input sensor IS may be directly disposed on the display panel DP. The display panel DP and the input sensor IS may be formed through a series of processes. Therefore, no adhesion layer may be separately disposed between the input sensor IS and the display panel DP.

The antireflection layer ARL may be directly disposed on the input sensor IS. The antireflection layer ARL may decrease a reflectance of external light incident from outside the electronic device (see ED of FIG. 1A). The antireflection layer ARL may include color filters. The color filters may have a certain arrangement. In an embodiment, for example, the color filters may be arranged in consideration of emission colors of pixels included in the display panel DP. In an embodiment, the antireflection layer ARL may further include a black matrix adjacent to the color filters.

In an embodiment of the invention, the input sensor IS and the antireflection layer ARL may be positioned interchangeably with each other. In an embodiment of the invention, the antireflection layer ARL may include a polarization film. The polarization film may be coupled through an adhesion layer to the input sensor IS.

Figure 5A:
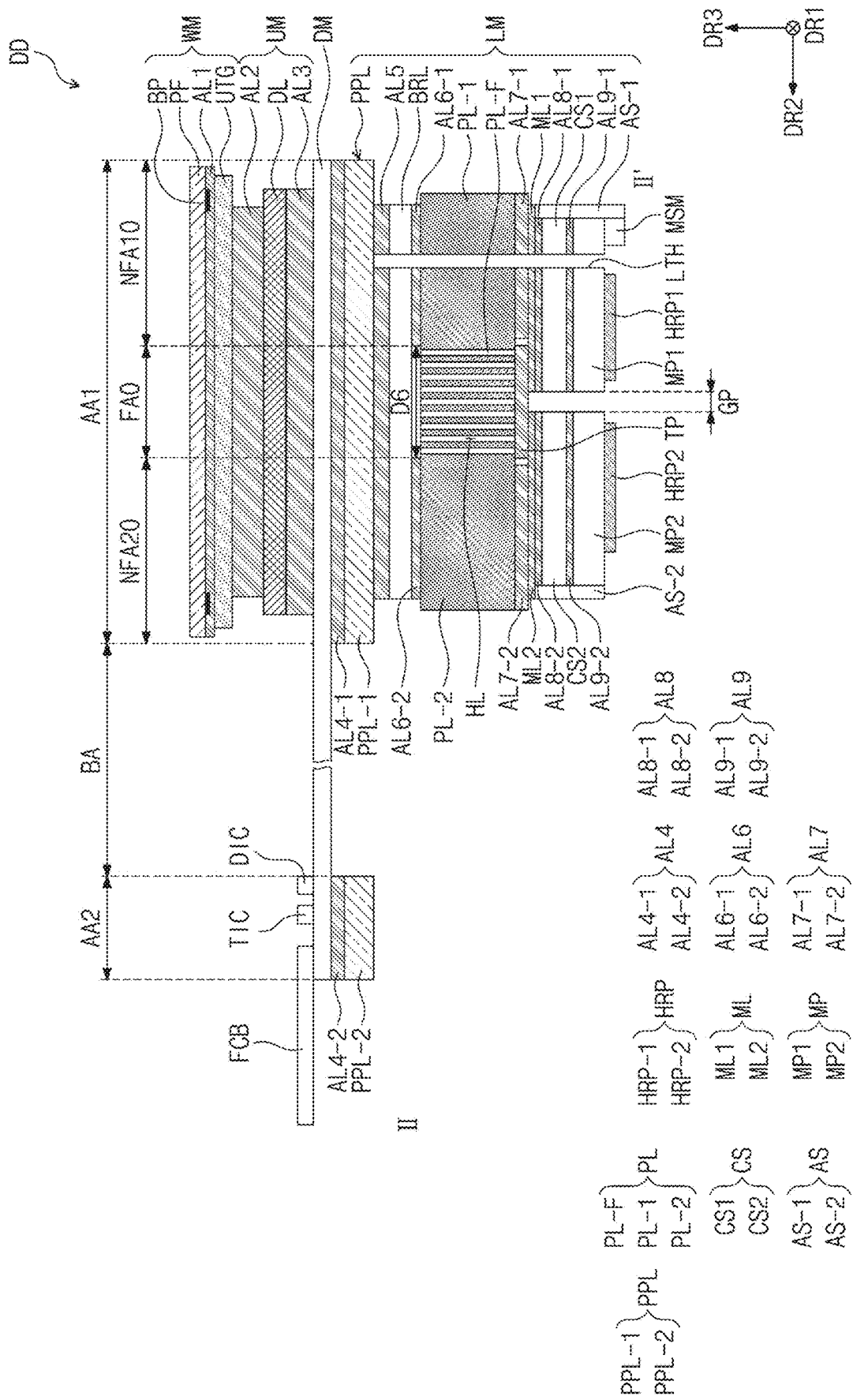
FIG. 5A illustrates a cross-sectional view taken along line II-II' of FIG. 3A.
Figure 5B:
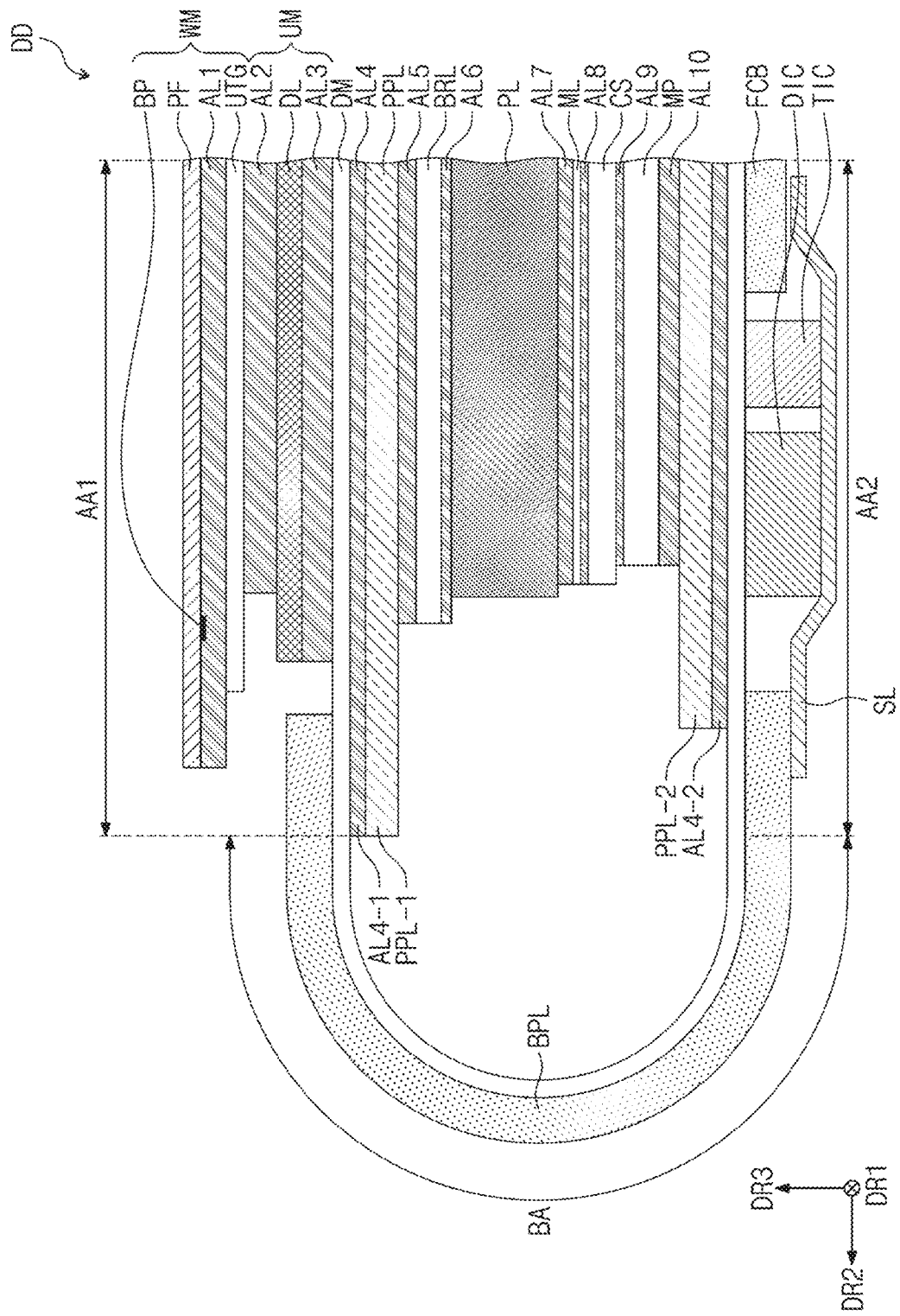
FIG. 5B illustrates a cross-sectional view showing an electronic device in a bent state according to an embodiment of the invention.

FIG. 5A illustrates a cross-sectional view taken along line II-II' of FIG. 3A. FIG. 5B illustrates a cross-sectional view showing an electronic device in a bend state according to an embodiment of the invention.

In an embodiment, the electronic panel DD may include a window WM, an upper member UM, a display module DM, and a lower member LM. The upper member UM may collectively indicate components disposed between the window WM and the display module DM, and the lower member LM may collectively indicate components disposed below the display module DM.

The window WM may include a thin glass substrate UTG, a window protection layer PF disposed on the thin glass substrate UTG, and a bezel pattern BP disposed on a bottom surface of the window protection layer PF. In an embodiment, the window protection layer PF may include a synthetic resin film. A functional layer may be disposed on the window protection layer PF.

The bezel pattern BP may be disposed on either one surface of the thin glass substrate UTG or one surface of the window protection layer PF. FIG. 5A depicts by way of example an embodiment where the bezel pattern BP is disposed on the bottom surface of the window protection layer PF. The invention, however, is not limited thereto, and alternatively, the bezel pattern BP may be disposed on a top surface of the window protection layer PF. The bezel pattern BP may be a colored light-shield layer. The bezel pattern BP may be formed by, for example, a coating method. The bezel pattern BP may include a base material and a dye or pigment mixed in the base material. The non-display region NDA depicted in FIG. 1A may be defined by a shape of the bezel pattern BP.

The thin glass substrate UTG may have a thickness in a range of about 15 micrometers ($\mu m$) to about 45 $\mu m$. The thin glass substrate UTG may be a chemically tempered glass. Even when the thin glass substrate UTG repeats its folding and unfolding states, the thin glass substrate UTG may minimize the occurrence of wrinkles.

The window protection layer PF may have a thickness in a range of about 50 $\mu m$ to about 80 $\mu m$. The synthetic resin film of the window protection layer PF may include polyimide, polycarbonate, polyamide, triacetyl cellulose, polymethylmethacrylate, or polyethylene terephthalate.

According to an embodiment, the window WM may further include a functional layer disposed on the top surface of the window protection layer PF. The functional layer may include at least one selected from a hard coating layer, an anti-fingerprint layer, and an antireflection layer.

The window protection layer PF and the thin glass substrate UTG may be coupled to each other through a first adhesion layer AL1. The first adhesion layer AL1 may be a pressure sensitive adhesive (PSA) film or an optically clear adhesive (OCA). The following adhesion layers may include a same adhesive as that of the first adhesion layer AL1.

The first adhesion layer AL1 may be separated from the thin glass substrate UTG. In an embodiment, for example, an adhesive force between the first adhesion layer AL1 and the thin glass substrate UTG may be less than that between the first adhesion layer AL1 and the window protection layer PF. The window protection layer PF may be located higher than the thin glass substrate UTG, and thus scratches may be relatively easily created on the window protection layer PF. After the separation of the first adhesion layer AL1 and the window protection layer PF from each other, a new window protection layer PF may be attached to the thin glass substrate UTG.

The upper member UM may include an upper film DL. The upper film DL may include a synthetic resin film. The synthetic resin film may include polyimide, polycarbonate, polyamide, triacetyl cellulose, polymethylmethacrylate, or polyethylene terephthalate.

The upper film DL may absorb external impact applied to a front surface of the electronic panel DD. The display module DM discussed with reference to FIG. 4 may include the antireflection layer ARL that substitutes for a polarization film, and thus there may be a reduction in impact strength on the front surface of the electronic panel DD. The upper film DL may compensate for the reduction of impact strength caused by adopting the antireflection layer ARL. In an embodiment of the invention, the upper film DL may be omitted. The thin glass substrate UTG and the upper film DL may be coupled to each other through a second adhesion layer AL2. The upper film DL and the display module DM may be coupled to each other through a third adhesion layer AL3.

The lower member LM may include a panel protection layer PPL, a barrier layer BRL, a lower plate PL, a metal layer ML, a cushion layer CS, a metal plate MP, a heat radiation layer HRP, a magnetic shield sheet MSM, and a step compensation member AS.

The panel protection layer PPL may be disposed below the display module DM. The panel protection layer PPL may protect a lower portion of the display module DM. The panel protection layer PPL may include a flexible synthetic resin film. In an embodiment, for example, the panel protection layer PPL may include a base film and a shield part. The base film may include one of polyurethane and polyimide. The shield part may include magnetic metal powder (MMP). Therefore, the panel protection layer PPL according to an embodiment of the invention may have a function of shielding a magnetic field. The shield part may be disposed on a top surface of the panel protection layer PPL adjacent to the display module DM, or the magnetic metal powder may be disposed within the panel protection layer PPL. This will be described in detail below.

In an embodiment, the panel protection layer PPL may not be disposed on (or may not overlap) the bending region BA. In such an embodiment, the panel protection layer PPL may include a first panel protection layer PPL-1 that protects the first non-bending region AA1 of the display panel (see DP of FIG. 3A) and a second panel protection layer PPL-2 that protects the second non-bending region AA2 of the display panel DP. The second panel protection layer PPL-2 may include only the base film without the shield part.

A fourth adhesion layer AL4 may couple the panel protection layer PPL and the display module DM to each other. The fourth adhesion layer AL4 may include a first part AL4-1 that corresponds to the first panel protection layer PPL-1 and a second part AL4-2 that corresponds to the second panel protection layer PPL-2.

In an embodiment, as illustrated in FIG. 5B, the bending region BA may bend about an imaginary bending axis that extends in the first direction DR1. When the bending region BA bends, the second panel protection layer PPL-2 together with the second non-bending region AA2 may be disposed below the first non-bending region AA1 and the first panel protection layer PPL-1. As the panel protection layer PPL is not disposed on the bending region BA, the bending region BA may easily bend. The second panel protection layer PPL-2 may be attached through a tenth adhesion layer AL10 to the metal plate MP. Alternatively, the tenth adhesion layer AL10 may be omitted.

The bending region BA may have a certain curvature and a curvature radius (or a radius of curvature) in a bending state. The curvature radius may be in a range from about 0.1 millimeter (mm) to about 0.5 mm. A bending protection layer BPL may be disposed on the bending region BA. The bending protection layer BPL may overlap the bending region BA, the first non-bending region AA1, and the second non-bending region AA2. The bending protection layer BPL may be disposed on an entirety of the bending region BA, a portion of the first non-bending region AA1, and a portion of the second non-bending region AA2.

The bending protection layer BPL may bend together with the bending region BA. The bending protection layer BPL may protect the bending region BA against external impact and may control a neutral surface of the bending region BA. The bending protection layer BPL may control stress of the bending region BA so as to allow signal lines on the bending region BA to approach near the neutral surface.

When the bending region BA bends, the first driver chip DIC and the second driver chip TIC disposed on the second non-bending region AA2 may overlap a rear surface of the display module DM that overlaps the first non-bending region AA1.

The electronic panel DD according to an embodiment may further include a dielectric tape SL. The dielectric tape SL may be disposed on a distal end of the bending protection layer BPL to cover the first driver chip DIC and the second driver chip TIC. The dielectric tape SL may effectively prevent the first driver chip DIC and/or the second driver chip TIC from being influenced by static electricity introduced from outside.

Referring back to FIG. 5A, the barrier layer BRL may be disposed below the panel protection layer PPL. The barrier layer BRL and the panel protection layer PPL may be coupled to each other through a fifth adhesion layer AL5.

The barrier layer BRL may increase resistance to compressive force resulting from external suppression. Therefore, the barrier layer BRL may serve to prevent the display panel DP from being deformed. The barrier layer BRL may include a flexible plastic material, such as polyimide, polycarbonate, polyamide, triacetyl cellulose, polymethylmethacrylate, or polyethylene terephthalate.

Additionally or alternatively, the barrier layer BRL may be a colored film whose optical transmittance is low. The barrier layer BRL may absorb externally incident light. In an embodiment, for example, the barrier layer BRL may be a black synthetic resin film. When the electronic panel DD is viewed from an upper side of the window protection layer PF, components disposed below the barrier layer BRL may be invisible to users.

A sixth adhesion layer AL6 may couple the barrier layer BRL and the lower plate PL to each other. In such an embodiment, at least a portion of the sixth adhesion layer AL6 that overlaps the folding region FA may be removed. FIG. 5A depicts an embodiment where the sixth adhesion layer AL6 includes a first part AL6-1 and a second part AL6-2 that are separated from each other, but the invention is not limited thereto. In an embodiment, for example, a portion of the sixth adhesion layer AL6 overlapping the folding region FA may be removed in the third direction DR3, but the invention is not limited to a certain embodiment.

According to an embodiment, a spacing distance D6 (or interval) between the first part AL6-1 and the second part AL6-2 may correspond to a width of the folding region FA0 and may be greater than a gap GP which will be described in detail below. The spacing distance D6 between the first part AL6-1 and the second part AL6-2 may be in a range from about 5 mm to about 15 mm.

In an embodiment, the first part AL6-1 and the second part AL6-2 are defined as different parts of one adhesion layer, but the invention is not limited thereto. When the first part AL6-1 is defined as one adhesion layer (e.g., first adhesion layer or second adhesion layer), the second part AL6-2 may be defined as another adhesion layer (e.g., second adhesion layer or third adhesion layer). The above definition may be applicable not only to the sixth adhesion layer AL6, but also to any one of subsequently described adhesion layers each including two parts.

The lower plate PL may include a first non-folding part PL-1 that overlaps the first non-folding region NFA10, a folding part PL-F that overlaps the folding region FA0, and a second non-folding part PL-2 that overlaps the second non-folding region NFA20. According to an embodiment, the folding part PL-F may be provided with holes HL that are defined therethrough to extend from top to bottom surfaces of the folding part PL-F. The lower plate PL may include stainless steel. As the lower plate PL is provided with the holes HL defined therethrough to overlap the folding part PL-F, a shape of the display module DM may be easily changed when the electronic device ED is in the folding operation.

The metal layer ML may be disposed below the lower plate PL. The metal layer ML may include a first metal layer ML1 and a second metal layer ML2 that overlap the first non-folding part PL-1 and the second non-folding part PL-2, respectively. The first metal layer ML1 and the second metal layer ML2 may each overlap a portion of the folding part PL-F and may be spaced apart from each other on a region that overlaps the folding part PL-F.

The metal layer ML may outwardly discharge heat generated when the display panel DP and/or the digitizer DTM are operated. The metal layer ML may downwardly transfer heat produced from the display panel DP and/or the digitizer DTM. The metal layer ML may have electrical conductivity and thermal conductivity greater than those of the metal plate MP which will be described in detail below. The metal layer ML may include copper or aluminum. The metal layer ML whose electrical conductivity is relatively high may prevent the digitizer DTM from being affected by noise or electromagnetic waves generated from the electronic module (see EM of FIG. 2A) disposed below.

A seventh adhesion layer AL7 may couple the digitizer DTM and the metal layer ML to each other. The seventh adhesion layer AL7 may include a first part AL7-1 and a second part AL7-2 that correspond to the first metal layer ML1 and the second metal layer ML2.

According to an embodiment, the electronic panel DD may further include a cover layer TP. The cover layer TP may be disposed between the first part AL7-1 and the second part AL7-2. The cover layer TP may overlap the folding part PL-F of the lower plate PL. The cover layer TP may prevent eternal foreign substances from being introduced into the holes HL of the folding part PL-F. The cover layer TP according to an embodiment may include polyurethane.

The cushion layer CS may include a first cushion layer CS1 and a second cushion layer CS2 that overlap the first non-folding part PL-1 and the second non-folding part PL-2, respectively. The first cushion layer CS1 and the second cushion layer CS2 may each overlap a portion of the folding part PL-F and may be spaced apart from each other on a region that overlaps the folding part PL-F.

The first cushion layer CS1 and the second cushion layer CS2 may prevent introduction of foreign substances into the holes HL when the electronic panel DD is folded. In addition, even though the folding part PL-F folds with a certain curvature when the electronic panel DD is unfolded, as the first cushion layer CS1 and the second cushion layer CS2 are spaced apart from each other on a region that overlaps the folding part PL-F, a shape of the digitizer DTM may be easily changed.

The cushion layer CS may be disposed below the metal layer ML. The cushion layer CS may protect the display module DM against impact transmitted from below the display module DM. The cushion layer CS may include foaming foam or sponge. The foaming foam may include urethane foam or thermoplastic polyurethane foam. In such an embodiment where the cushion layer CS includes foaming foam, a barrier film may be added as a base layer of the cushion layer CS and a foaming agent may be foamed on the barrier film to form the cushion layer CS.

An eighth adhesion layer AL8 may couple the metal layer ML and the cushion layer CS to each other. The eighth adhesion layer AL8 may include a first part AL8-1 and a second part AL8-2 that correspond to the first cushion layer CS1 and the second cushion layer CS2.

The metal plate MP may be disposed below the cushion layer CS. The metal plate MP may include a first metal plate layer MP1 and a second metal plate MP2 that overlap the first cushion layer CS1 and the second cushion layer CS2, respectively. The metal plate MP may absorb external impact applied from below the metal plate MP. The metal plate MP may have strength and thickness greater than those of the metal layer ML. The metal plate MP may include a metallic material, such as stainless steel.

A ninth adhesion layer AL9 may couple the cushion layer CS and the metal plate MP to each other. The ninth adhesion layer AL9 may include a first part AL9-1 and a second part AL9-2 that correspond to the first metal plate MP1 and the second metal plate MP2.

The heat radiation layer HRP may be disposed below the metal plate MP. The heat radiation layer HRP may include a first heat radiation layer HRP1 and a second heat radiation layer HRP2 that overlap the first metal plate MP1 and the second metal plate MP2, respectively. The heat radiation layer HRP may discharge heat generated from electronic components disposed below. The electronic components may be the electronic module EM depicted in FIGS. 2A and 2B. The heat radiation layer HRP may have a structure in which at least one adhesion layer and at least one graphite layer are alternately stacked. The heat radiation layer HRP may be attached to the metal plate MP through an adhesion layer that is additionally disposed between the heat radiation layer HRP and the metal plate MP.

The magnetic shield sheet MSM may be disposed below the metal plate MP. The magnetic shield sheet MSM may shield a magnetic field generated from a magnetic substance (not shown) disposed below. The magnetic shield sheet MSM may effectively prevent the digitizer DTM from being interfered by the magnetic field generated from the magnetic substance.

The magnetic shield sheet MSM may include a plurality of parts. At least one of the plurality of parts may have a thickness different from those of other parts. The plurality of parts may be disposed to conform to a step difference on a bracket (not shown) disposed below the electronic panel DD. The magnetic shield sheet MSM may have a structure in which at least one magnetic shield layer and at least one adhesion layer are alternately stacked. A portion of the magnetic shield sheet MSM may be directly attached to the metal plate MP.

The step compensation member AS may be coupled below the seventh adhesion layer AL7. The step compensation member AS may be a double-sided tape or a dielectric film. The step compensation member AS may be provided as a first step compensation member AS-1 and a second step compensation member AS-2 to compensate for a step difference defined by different widths between components included in the lower member LM.

Functional layers disposed below the first non-folding part PL-1 and the second non-folding parts PL-2 of the lower member LM may be disposed spaced apart from each other across a certain gas GP on a region that overlaps the folding part PL-F. The gap GP may be in a range from about 0.3 mm to about 3 mm.

Through holes LTH may be defined or formed in some components of the lower member LM. The through hole LTH may be disposed to overlap the sensing region DP-TA of FIG. 2A. In an embodiment, as illustrated in FIG. 5A, the through hole LTH may be defined through layers from the fifth adhesion layer AL5 to the metal plate MP. The through hole LTH may be the same as or defined by a hollow portion obtained when a light-shield structure is removed from an optical signal path, and may cause an increase in optical signal receiving efficiency of the electro-optical module ELM.

In an embodiment, at least one selected from the metal layer ML, the cushion layer CS, the metal plate MP, the cover layer TP, and the step compensation member AS may be omitted from the electronic device ED, but the invention is not limited to a certain embodiment.

Figure 6:
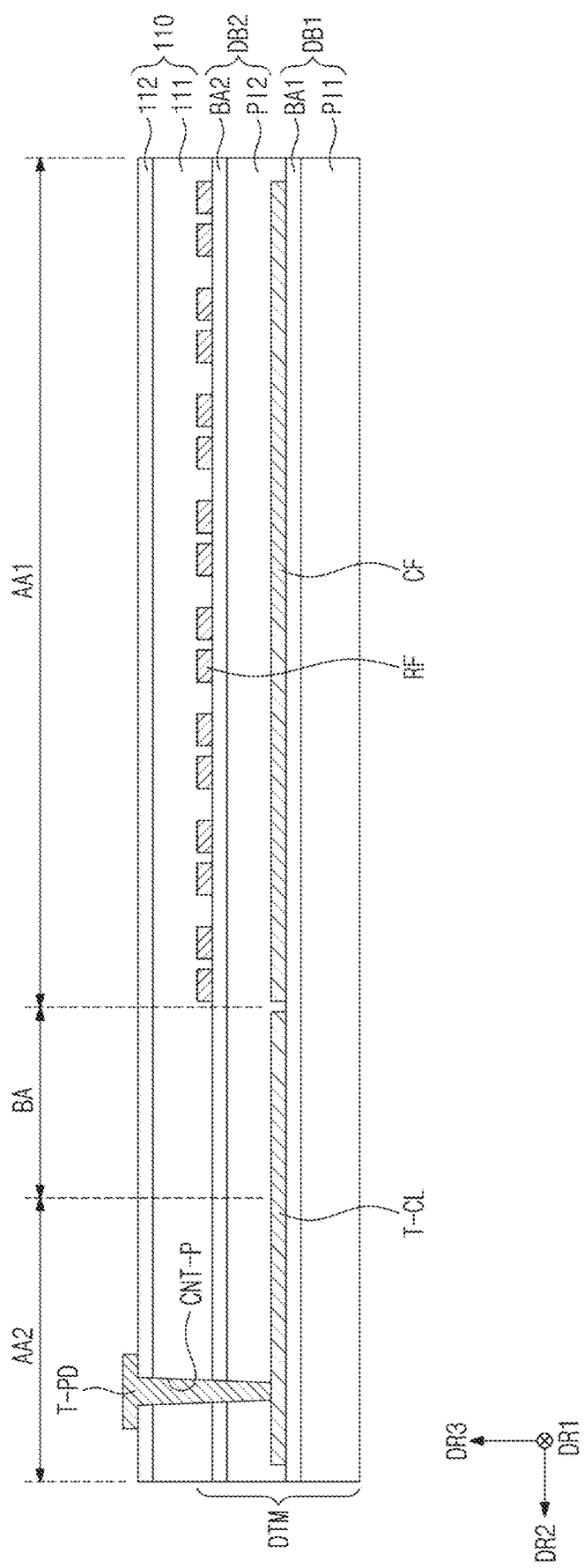
FIG. 6 illustrates a cross-sectional view showing a base layer and a digitizer according to an embodiment of the invention.
Figure 7:
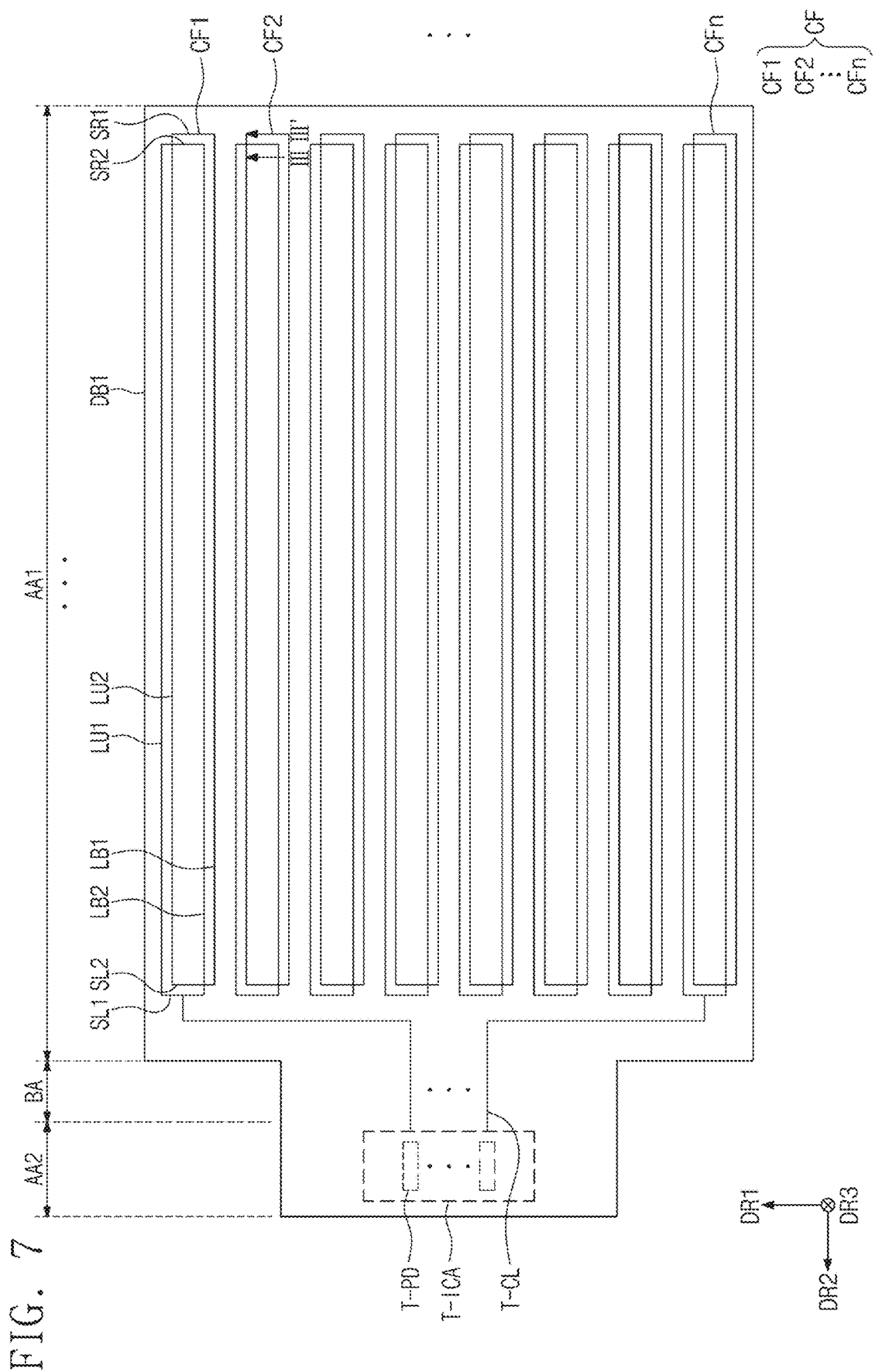
FIG. 7 illustrates a plan view showing a digitizer according to an embodiment of the invention.
Figure 8:
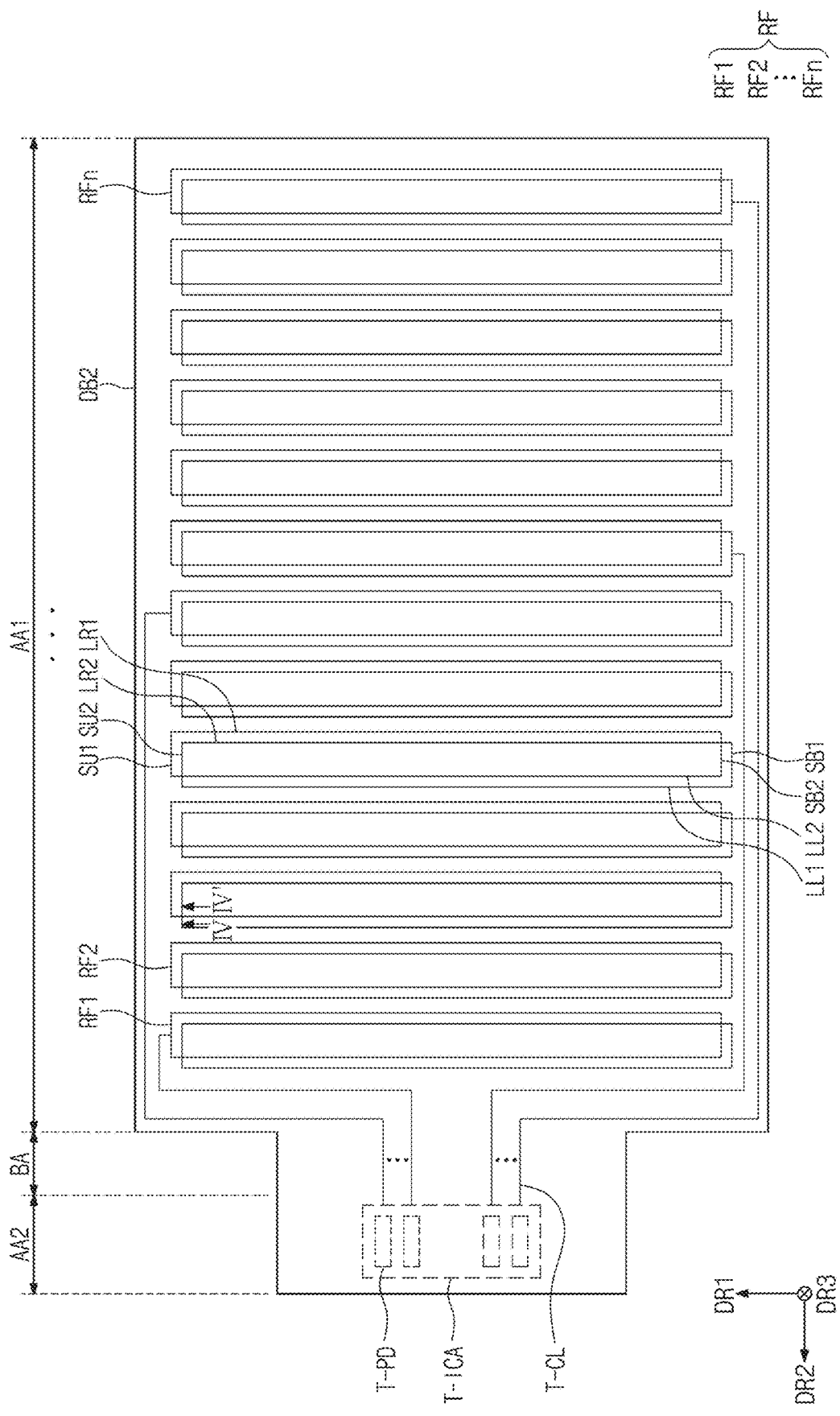
FIG. 8 illustrates a plan view showing a digitizer according to an embodiment of the invention.
Figure 9A:
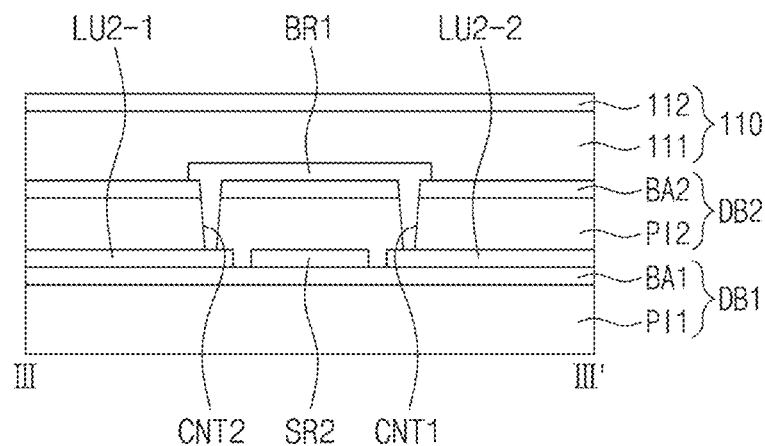
FIG. 9A illustrates a cross-sectional view taken along line III-III' of FIG. 7.
Figure 9B:
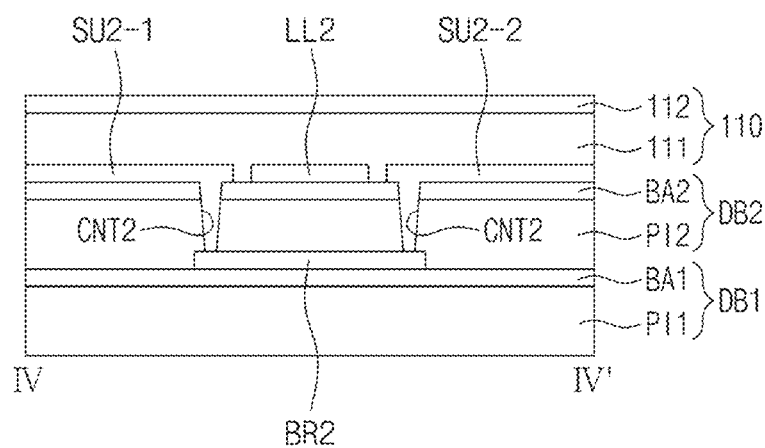
FIG. 9B illustrates a cross-sectional view taken along line IV-IV' of FIG. 8.

FIG. 6 illustrates a cross-sectional view showing a base layer and a digitizer according to an embodiment of the invention. FIG. 7 illustrates a plan view showing a digitizer according to an embodiment of the invention. FIG. 8 illustrates a plan view showing a digitizer according to an embodiment of the invention. FIG. 9A illustrates a cross-sectional view taken along line III-III' of FIG. 7. FIG. 9B illustrates a cross-sectional view taken along line IV-IV' of FIG. 8.

Referring to FIG. 6, the digitizer DTM according to an embodiment may be directly disposed below the base layer 110 of the display panel (see DP of FIG. 4).

The digitizer DTM may include a lower layer DB1, first loop coils CF, an upper layer DB2, second loop coils RF, connection lines T-CL, and sensing pads T-PD. The lower layer DB1 may provide a bottom surface of the digitizer DTM. Therefore, the fourth adhesion layer (AL4 of FIG. 5A) may be in contact with a lower portion of the lower layer DB1.

The first loop coils CF may be disposed on the lower layer DB1. Each of the first loop coils CF may include copper. The first loop coils CF may overlap the first non-bending region AA1.

The connection lines T-CL may be disposed on the lower layer DB1. The connection lines T-CL may be connected to corresponding first loop coils CF. The connection lines T-CL connected to corresponding first loop coils CF on the first non-bending region AA1 may extend toward the bending region BA and the second non-bending region AA2. The invention, however, is not limited thereto, and at least one selected from the connection lines T-CL according to an embodiment may be disposed on the upper layer DB2.

The first loop coils CF may correspond to input coils in the digitizer DTM of electromagnetic resonance type, and the second loop coils RF may correspond to output coils in the digitizer DTM of electromagnetic resonance type. The invention, however, is not limited thereto, and the second loop coils RF may correspond to the input coils and the first loop coils CF may correspond to the output coils.

The first loop coils CF may correspondingly receive scan signals activated in different periods from each other. In response to a corresponding scan signal, each of the second loop coils RF may generate a magnetic field.

When an electromagnetic pen approaches the first loop coils CF, a magnetic field induced from the first loop coils CF may resonate with a resonance circuit of the electromagnetic pen to produce a resonance frequency. In this case, the electromagnetic pen may be equipped with an LC resonance circuit including an inductor and a capacitor. The second loop coils RF may output to the connection lines T-CL sensing signals in accordance with resonance frequency of an input means.

Referring to FIG. 7, the first loop coils CF may include a first first coil (hereinafter, will be referred to as "1-$1^{st}$ coil") CF1 to an n-th first coil (hereinafter, will be referred to as "1-$n^{th}$ coil") CFn. Although FIG. 7 depicts an embodiment where the 1-$1^{st}$ coil CF1 to the 1-$n^{th}$ coil CFn are spaced apart from each other along the first direction DR1, portions of coils adjacent to each other along the first direction DR1 may overlap each other, but the invention is not limited to a certain embodiment.

Each of the 1-$1^{st}$ coil CF1 to the 1-$n^{th}$ coil CFn may include an upper long side LU1 and LU2 and a lower long side LB1 and LB2 that extend in the second direction DR2, and may also include a right short side SR1 and SR2 and a left short side SL1 and SL2 that extend in the first direction DR1.

A first upper long side LU1, a second right short side SR2, a second lower long side LB2, and a first left short side SL1 may be connected to each other to form one first loop, and a second upper long side LU2, a first right short side SR1, a first lower long side LB1, and a second left short side SL2 may be connected to each other to form one second loop. One of the first loop and the second loop may be an open loop. At least one selected from one and another ends of the open loop may be connected to a corresponding connection line T-CL.

FIG. 9A depicts a connection relationship at an intersection between the second upper long side LU2 and the second right short side SR2. The connection relationship at the intersection in FIG. 9A may be applied to any connection relationship at an intersection between coils disposed on the lower layer DB1.

The second right short side SR2 and the second upper long side LU2 may be disconnected to each other at the intersection on the lower layer DB1. The second right short side SR2 may be disposed between a first second upper long side (hereinafter, will be referred to as "2-1$^{st}$ upper long side") LU2-1 and a second second upper long side ((hereinafter, will be referred to as "2-2$^{nd}$ upper long side") LU2-2. The digitizer (see DTM of FIG. 6) according to an embodiment may further include a first bridge pattern BR1 to connect the 2-1$^{st}$ upper long side LU2-1 and the 2-2$^{nd}$ upper long side LU2-2 that are disconnected to each other. The first bridge pattern BR1 may be disposed on the upper layer DB2. The first bridge pattern BR1 may overlap the second right short side SR2.

One side of the first bridge pattern BR1 may be connected to the 2-1$^{st}$ upper long side LU2-1 through one first contact hole CNT1 defined in the upper layer DB2. Another side of the first bridge pattern BR1 may be connected to the 2-2$^{nd}$ upper long side LU2-2 through another first contact hole CNT1 defined in the upper layer DB2. Therefore, each of the 1-1$^{st}$ coil CF1 to the 1-n$^{th}$ coil CFn may be disposed in a same layer as each other to easily form the first loop and the second loop that are partially overlap each other.

The connection lines T-CL connected to the 1-1$^{st}$ coil CF1 to the 1-n$^{th}$ coil CFn may extend from the first non-bending region AA1 through the bending region BA toward the second non-bending region AA2, thereby being connected to corresponding sensing pads T-PD. A pad region T-ICA may correspond to a region to which the second driver chip TIC is connected.

The upper layer DB2 may be disposed on the lower layer DB1 to cover the first loop coils CF and the connection lines T-CL.

The second loop coils RF may be disposed on the upper layer DB2. Each of the second loop coils RF may include copper. The second loop coils RF may overlap the first non-bending region AA1.

The second loop coils RF may be connected to corresponding connection lines T-CL. The second loop coils RF may be connected to corresponding connection lines T-CL through contact holes defined in the upper layer DB2 or may be directly connected to connection lines disposed on the upper layer DB2.

Referring to FIG. 8, the second loop coils RF may include a first second coil (hereinafter, will be referred to as "2-1$^{st}$ coil") RF1 to an n-th second coil (hereinafter, will be referred to as "2-n$^{th}$ coil") RFn. Although FIG. 8 depicts an embodiment where the 2-1$^{st}$ coil RF1 to the 2-n$^{th}$ coil RFn are spaced apart from each other along the second direction DR2, portions of coils adjacent to each other along the second direction DR2 may overlap each other, but the invention is not limited to a certain embodiment.

Each of the 2-1$^{st}$ coil RF1 to the 2-n$^{th}$ coil RFn may include a right long side LR1 and LR2 and a left long side LL1 and LL2 that extend in the first direction DR1, and may also include an upper short side SU1 and SU2 and a lower short side SB1 and SB2 that extend in the second direction DR2.

A first right long side LR1, a second lower short side SB2, a second left long side LL2, and a first upper short side SU1 may be connected to each other to form one first loop, and a second right long side LR2, a first lower short side SB1, a first left long side LL1, and a second upper short side SU2 may be connected to each other to form one second loop.

One of the first loop and the second loop may be an open loop. At least one selected from one and another ends of the open loop may be connected to a corresponding connection line T-CL.

FIG. 9B depicts a connection relationship at an intersection between the second upper short side SU2 and the second left long side LL2. The connection relationship at the intersection in FIG. 9A may be applied to any connection relationship at an intersection between coils disposed on the upper layer DB2.

The second left long side LL2 and the second upper short side SU2 may be disconnected to each other at the intersection on the upper layer DB2. The second left long side LL2 may be disposed between a first second upper short side (hereinafter, will be referred to as "2-1$^{st}$ upper short side") SU2-1 and a second second upper short side (hereinafter, will be referred to as "2-2$^{nd}$ upper short side") SU2-2. The digitizer (see DTM of FIG. 6) according to an embodiment may further include a second bridge pattern BR2 to connect the 2-1$^{st}$ upper short side SU2-1 and the 2-2$^{nd}$ upper short side SU2-2 that are disconnected to each other. The second bridge pattern BR2 may be disposed on the upper layer DB2. The second bridge pattern BR2 may overlap the second right long side LL2.

One side of the 2-1$^{st}$ upper short side SU2-1 may be connected to the second bridge pattern BR2 through one second contact hole CNT2 defined in the upper layer DB2. One side of the 2-2$^{nd}$ upper short side SU2-2 may be connected to the second bridge pattern BR2 through another second contact hole CNT2 defined in the upper layer DB2. Therefore, each of the 2-1$^{st}$ coil RF1 to the 2-n$^{th}$ coil RFn may be disposed in a same layer as each other to easily form the first loop and the second loop that are partially overlap each other.

The connection lines T-CL connected to the 2-1$^{st}$ coil RF1 to the 2-n$^{th}$ coil RFn may extend from the first non-bending region AA1 through the bending region BA toward the second non-bending region AA2, thereby being connected to corresponding sensing pads T-PD. The pad region T-ICA may correspond to a region to which the second driver chip TIC is connected. According to an embodiment, the connection lines T-CL connected to the 2-1$^{st}$ coil RF1 to the 2-n$^{th}$ coil RFn may be disposed on the upper layer DB2 to be covered with the base layer 110, but the invention is not limited to a certain embodiment.

Referring back to FIG. 6, the base layer 110 of the display panel DP may be disposed on the upper layer DB2 to cover the second loop coils RF. The base layer 110 may be formed by a series of processes by which the digitizer DTM is formed, and may thus be directly disposed on the upper layer DB2. The base layer 110 may be provided thereon with the circuit layer 120 including the dielectric layers, the transistors, and the circuit lines connected to the transistors that are described above with reference to FIG. 4.

The sensing pads T-PD may be disposed on the second non-bending region AA2. The sensing pads T-PD may be disposed on the base layer 110 to be exposed from the base layer 110. The sensing pads T-PD may be provided thereon with the second driver chip TIC shown in FIGS. 5A and 5B. The sensing pads T-PD may be connected to corresponding connection lines T-CL through contact holes defined in the upper layer DB2 and the base layer 110. Therefore, according to an embodiment of the invention, the first loop coils CF and the second loop coils RF may be electrically connected to the second driver chip TIC through the connection lines T-CL and the sensing pads T-PD.

According to an embodiment, each of the lower layer DB1, the upper layer DB2, and the base layer 110 may include a corresponding one of first layers PI1, PI2, and 111 (or organic layers) including an organic material, and may also include a corresponding one of second layers BA1, BA2, and 112 (or inorganic layers) including an inorganic material. The organic material may include polyimide. The inorganic material may include at least one selected from silicon nitride, silicon oxynitride, and silicon oxide.

According to an embodiment of the invention, the digitizer DTM and the display panel DP that are formed by a series of processes may be provided in the form of a single unitary body with no separate adhesion layer. The digitizer DTM may be configured such that the connection lines T-CL may extend to the bending region BA and the second non-bending region AA2, and such that the sensing pads T-PD may be exposed from the base layer 110 of the display panel DP to be connected to the second driver chip TIC, which may result in omission of a separate circuit board for driving the digitizer DTM. The digitizer DTM may thus have a thin thickness. Accordingly, the electronic device ED may have slimness and simplified components.

FIGS. 10A to 10E illustrate cross-sectional views showing a method of fabricating an electronic device according to an embodiment of the invention. The same or similar reference numerals will be allocated to components the same as or similar to those described above with reference to FIGS. 1A to 9B, and any repetitive description thereof will be omitted.

A method of fabricating an electronic device according to an embodiment may include a process of forming a lower layer on a work substrate, a process of forming on the lower layer first loop coils and connection lines connected to corresponding first loop coils, a process of forming an upper layer on the lower layer, forming on the upper layer second loop coils connected to corresponding connection lines through contact holes defined in the upper layer, a process of forming a base layer on the upper layer, and a process of forming on the base layer sensing pads connected to corresponding connection lines through contact holes defined in the upper layer and the base layer.

The method of fabricating an electronic device according to an embodiment may further include a process of forming on the base layer a circuit layer including dielectric layers, transistors, and circuit lines connected to the transistors, a process of forming on the circuit layer a light-emitting element layer including light-emitting elements connected to the transistors, and a process of forming an encapsulation layer to cover the light-emitting element layer. In addition, the method of fabricating an electronic device according to an embodiment may further include a process of connecting a first driver chip to display pads, and a process of connecting a second driver chip to sensing pads.

Figure 10A:
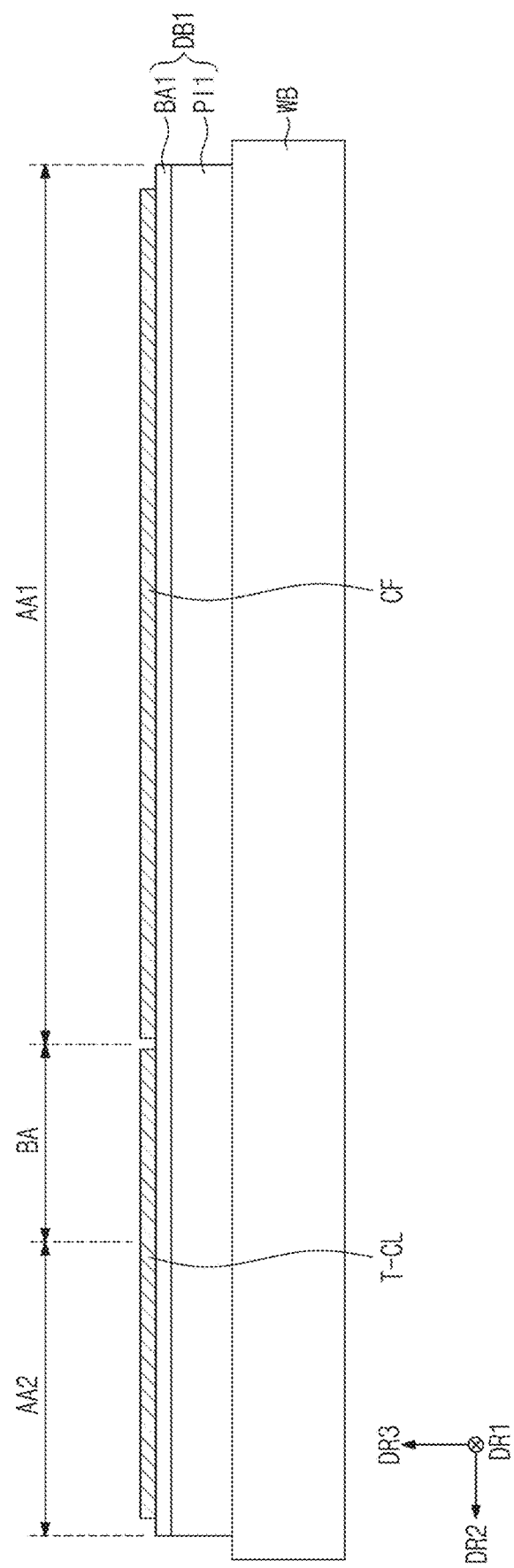
FIG. 10A illustrates a cross-sectional view showing a method of fabricating an electronic device according to an embodiment of the invention.

Referring to FIG. 10A, a method of fabricating an electronic device according to an embodiment may include a process of forming a lower layer DB1 on a work substrate WB. The lower layer DB1 may include a first organic layer PI1 including an organic material, and may also include a first inorganic layer BA1 formed on the first organic layer PI1 and including an inorganic material.

Afterwards, first loop coils CF may be formed on the lower layer DB1, and connection lines T-CL which are connected to corresponding first loop coils CF may be formed. The first loop coils CF and the connection lines T-CL may be formed on the lower layer DB1 by using one of a sputtering process, an electroless plating process, a trench process, and a transfer process. The first loop coils CF and the connection lines T-CL may include copper.

The first loop coils CF may be formed on a first non-bending region AA1 of the lower layer DB1, and the connection lines T-CL may be connected to corresponding first loop coils CF to extend from the first non-bending region AA1 through a bending region BA to a second non-bending region AA2.

Figure 10B:
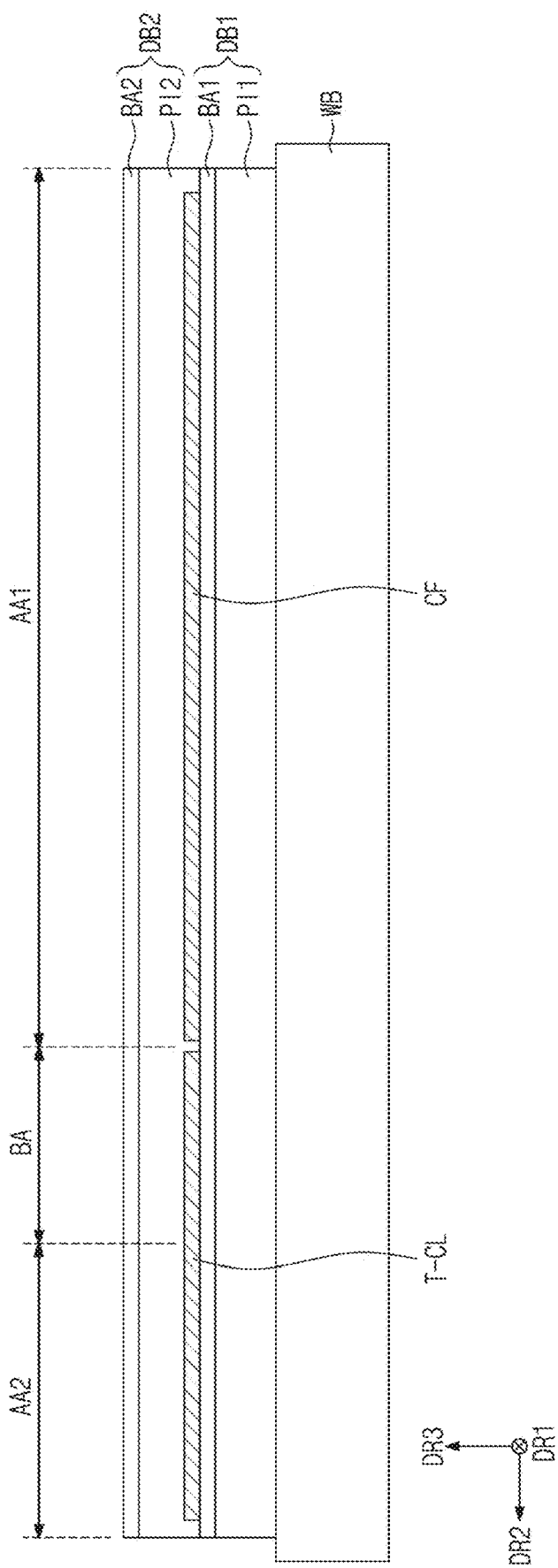
FIG. 10B illustrates a cross-sectional view showing a method of fabricating an electronic device according to an embodiment of the invention.

Referring to FIG. 10B, the method of fabricating an electronic device according to an embodiment may include a process of forming an upper layer DB2 on the lower layer DB1. The upper layer DB2 may include a second organic layer PI2 including an organic material, and may also include a second inorganic layer BA2 formed on the second organic layer PI2 and including an inorganic material.

Figure 10C:
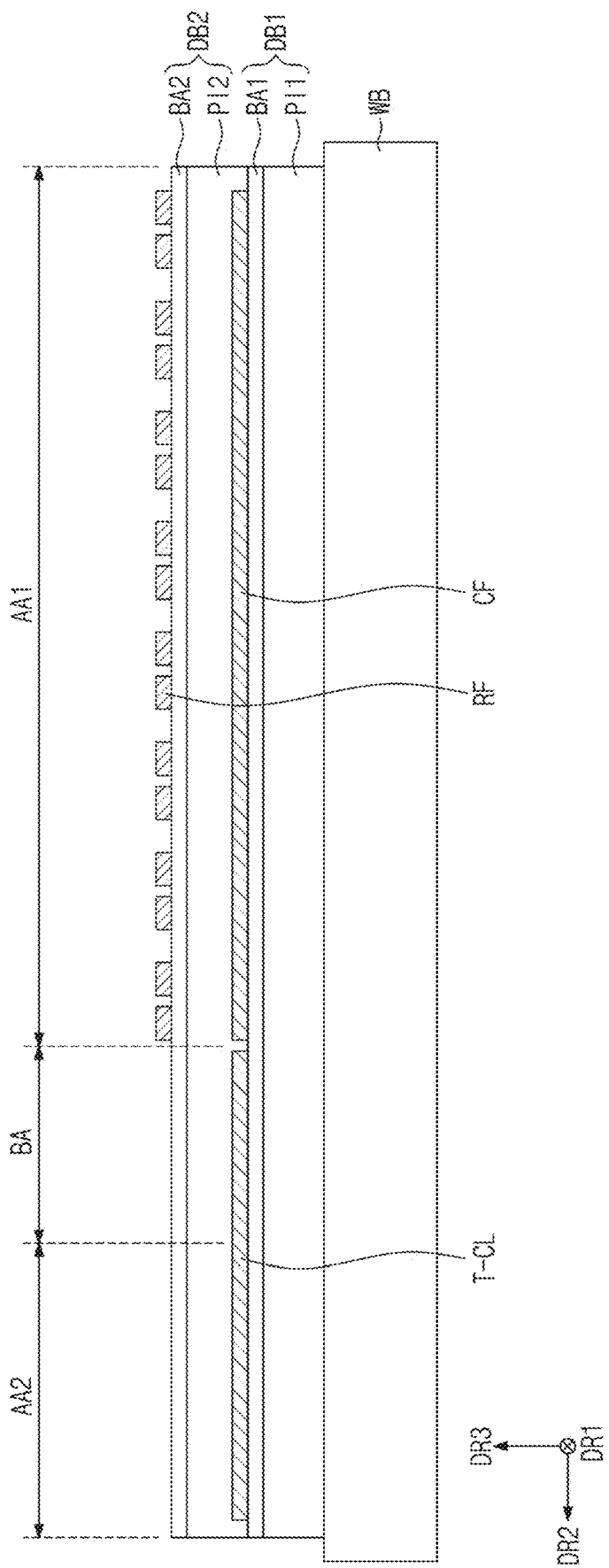
FIG. 10C illustrates a cross-sectional view showing a method of fabricating an electronic device according to an embodiment of the invention.

Referring to FIG. 10C, the method of fabricating an electronic device according to an embodiment may include a process of forming second loop coils RF on the upper layer DB2. The second loop coils RF may be formed by a same process used for forming the first loop coils CF. The second loop coils RF may include copper. The second loop coils RF may be connected to corresponding connection lines T-CL through contact holes defined in the upper layer DB2. The invention, however, is not limited thereto, and some of the connection lines T-CL may be formed on the upper layer DB2, and the connection lines T-CL formed on the upper layer DB2 may be directly connected to the second loop coils RF. The second loop coils RF may be formed on the first non-bending region AA1 of the upper layer DB2.

Figure 10D:
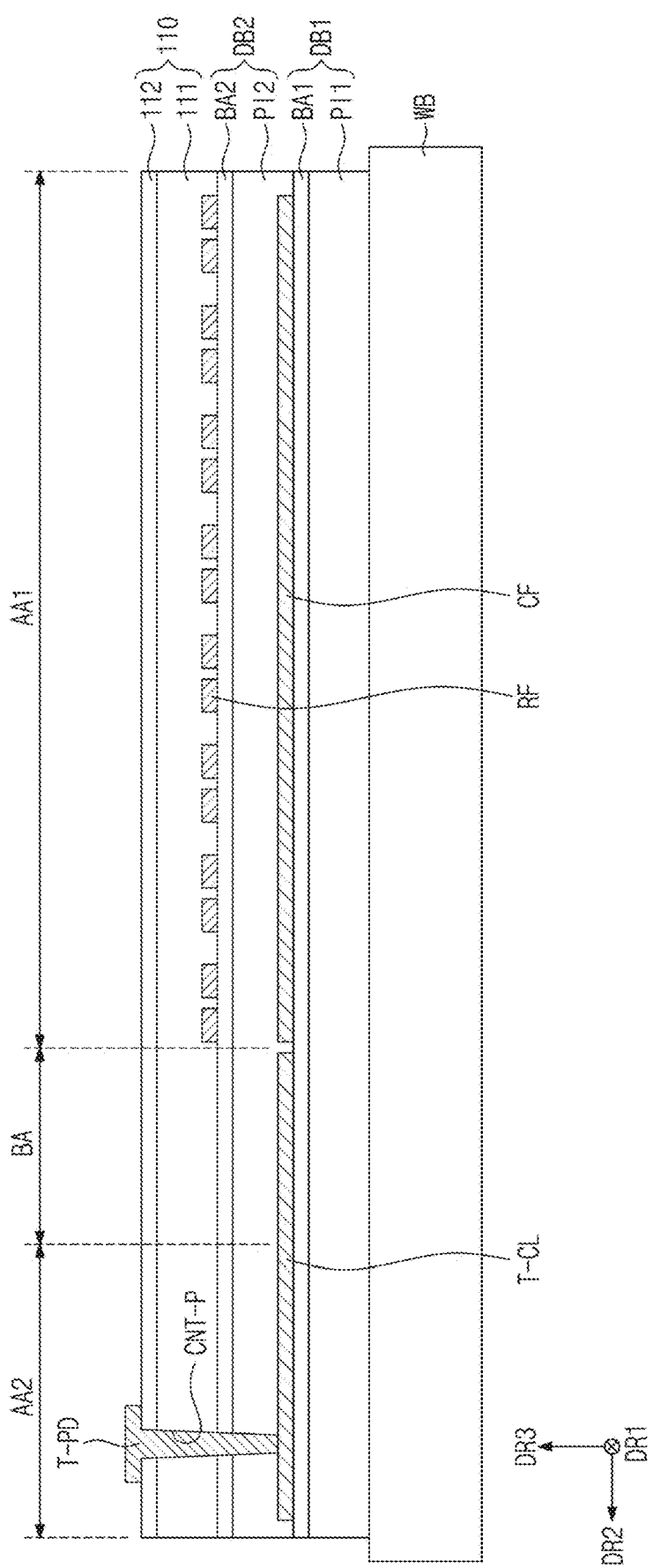
FIG. 10D illustrates a cross-sectional view showing a method of fabricating an electronic device according to an embodiment of the invention.

Referring to FIG. 10D, the method of fabricating an electronic device according to an embodiment may include a process of forming a base layer 110 on the upper layer DB2. The base layer 110 may correspond to the base layer 110 included in the display panel DP shown in FIG. 4.

The base layer 110 may include a first layer 111 including an organic material, and may also include a second layer 112 formed on the first layer 111 and including an inorganic material. According to an embodiment, the first organic layer PI1, the second organic layer PI2, and the first layer 111 may include the same organic material. In an embodiment, for example, the organic material may include polyimide. The first inorganic layer BA1, the second inorganic layer BA2, and the second layer 112 may include an inorganic material. In an embodiment, for example, the inorganic material may include at least one selected from silicon nitride, silicon oxynitride, and silicon oxide.

The method of fabricating an electronic device according to an embodiment may include a process of forming sensing pads T-PD on the base layer 110. The sensing pads T-PD may be formed on the base layer 110 to overlap the second non-bending region AA2. The sensing pads T-PD may be connected to corresponding connection lines T-CL through contact holes defined in the upper layer DB2 and the base layer 110.

Figure 10E:
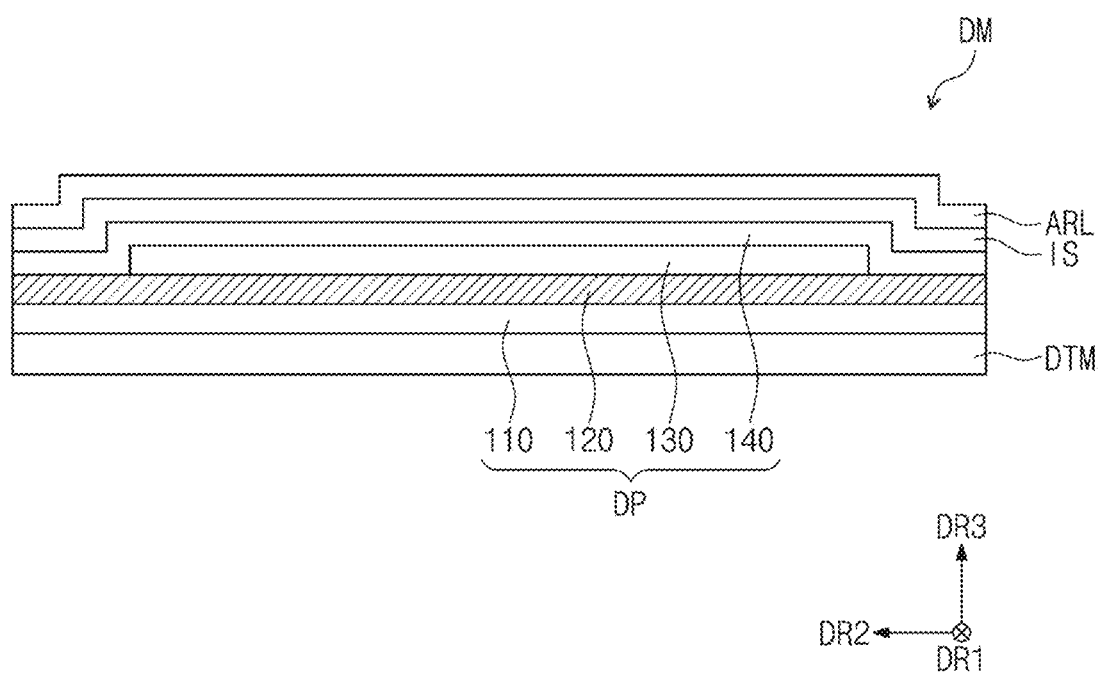
FIG. 10E illustrates a cross-sectional view showing a method of fabricating an electronic device according to an embodiment of the invention.

Referring to FIG. 10E, the method of fabricating an electronic device according to an embodiment may include a process of forming on the base layer 110, a circuit layer 120, a light-emitting element layer 130, and an encapsulation layer 140.

The circuit layer 120 may include dielectric layers, transistors, each including at least one semiconductor pattern, circuit lines connected to the transistors, and display pads connected to the circuit lines. A coating or deposition process may be employed such that a dielectric layer, a semiconductor layer, and a conductive layer may be formed on the base layer 110, and then a photolithography process may be performed several times to selectively pattern the dielectric layer, the semiconductor layer, and the conductive layer.

The light-emitting element layer 130 may be formed on the circuit layer 120. The light-emitting element layer 130 may include a light-emitting element. In an embodiment, for example, the light-emitting element layer 130 may include an organic light-emitting material, a quantum dot, a quantum rod, or a micro-led.

The encapsulation layer 140 may be formed on the light-emitting element layer 130. The encapsulation layer 140 may include an inorganic layer, an organic layer, and an inorganic layer that are sequentially formed.

The method of fabricating an electronic device according to an embodiment may further include a process of connecting a first driver chip (see DIC of FIG. 3A) to display pads D-PD formed on the display panel DP and a process of forming a second driver chip (see TIC of FIG. 3A) to the sensing pads T-PD of the digitizer DTM. The first driver chip (see DIC of FIG. 3A) and the second driver chip (see TIC of FIG. 3A) may be disposed on the base layer 110 to overlap the second non-bending region AA2 of the display panel DP.

According to an embodiment of the invention, as the second driver chip (see TIC of FIG. 3A) for driving the digitizer DTM is disposed on the second non-bending region AA2 of the display panel DP, no circuit board may be provided to drive the digitizer DTM. Therefore, it may be possible to provide a method of fabricating an electronic device ED whose costs are reduced and whose components are simplified.

Figure 11A:
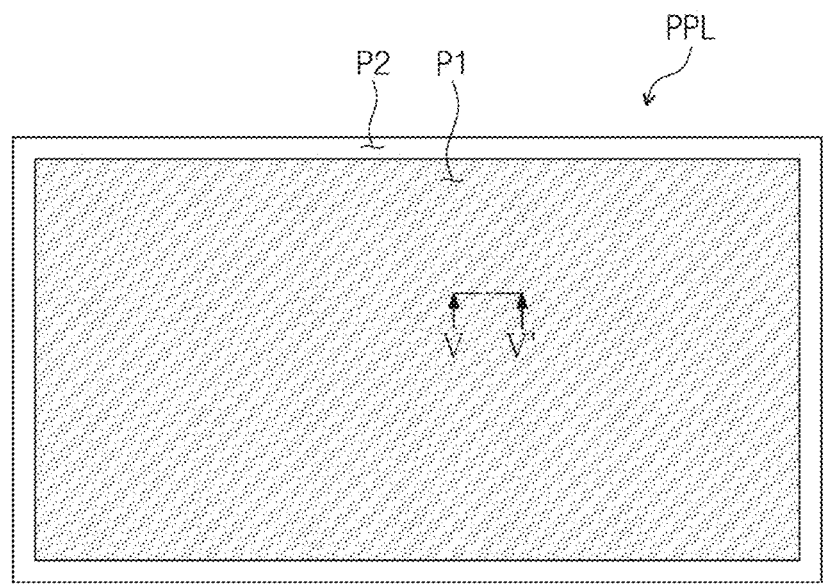
FIG. 11A illustrates a plan view showing a panel protection layer according to an embodiment of the invention.
Figure 11B:
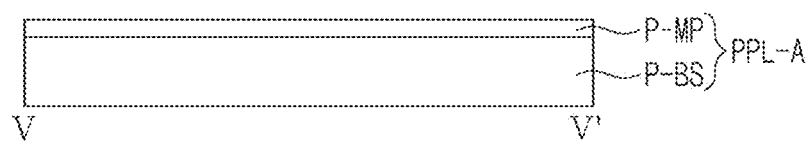
FIG. 11B illustrates a cross-sectional view taken along line V-V' of FIG. 11A.
Figure 11C:
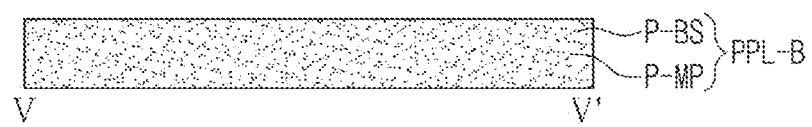
FIG. 11C illustrates a cross-sectional view taken along line V-V' of FIG. 11A.

FIG. 11A illustrates a plan view showing a panel protection layer according to an embodiment of the invention. FIG. 11B illustrates a cross-sectional view taken along line V-V' of FIG. 11A. FIG. 11C illustrates a cross-sectional view taken along line V-V' of FIG. 11A. The same or similar reference numerals will be allocated to components the same as or similar to those described above with reference to FIGS. 1A to 9B, and any repetitive description thereof will be omitted.

Referring to FIG. 11A, the panel protection layer PPL according to an embodiment may include a first region P1 and a second region P2 that surrounds the first region P1.

The first region P1 according to an embodiment may be defined as a region including a shield material. The shield material may include magnetic metal powder (MMP). The digitizer (see DTM of FIG. 5A) may include a sensing region that detects external inputs, and the first region P1 may overlap the sensing region of the digitizer DTM. Accordingly, the panel protection layer PPL may be formed to selectively include a region having a shield function.

Referring to FIG. 11B, a panel protection layer PPL-A according to an embodiment may include a base film P-BS and a shield part P-MP. According to an embodiment, the shield part P-MP may be formed on the base film P-BS. The shield part P-MP may be disposed closer than the base film P-BS to the digitizer (see DTM of FIG. 5A).

Referring to FIG. 11C, a panel protection layer PPL-B according to an embodiment may include a base film P-BS and a shield part P-MP. According to an embodiment, the shield part P-MP may include magnetic metal powder (MMP).

According to an embodiment, the magnetic metal powder (MMP) may be disposed within the base film P-BS.

The electronic device ED according to an embodiment of the invention may include the panel protection layer PPL, PPL-A, or PPL-B that not only protects a lower portion of the display module DM but also has a shield function, and thus a separate shield layer may be omitted. Accordingly, a slim electronic device ED may be provided.

According to an embodiment of the invention, a digitizer and a display panel may be formed by a series of processes to reduce a thickness of the digitizer. Hence, it may be possible to provide a slim electronic device whose components are simplified and a method of fabricating the slim electronic device.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device, comprising:
a display panel including a base layer and a pixel,
wherein the base layer includes:
a bending region which is bendable about an imaginary bending axis extending in a first direction; and
a first non-bending region and a second-bending region which are spaced apart along a second direction intersecting the first direction with the bending region interposed therebetween, and
wherein the pixel is on an upper surface of the base layer to overlap the first non-bending region;
a digitizer in contact with a lower surface opposing the upper surface of the base layer;
a first driver chip connected to the pixel and on a portion of the upper surface of the base layer overlapping the second non-bending region; and
a second driver chip connected to the digitizer and on a portion of the upper surface of the base layer overlapping the second non-bending region and spaced apart from the first driver chip.

2. The electronic device of claim 1, wherein the base layer includes:
a first layer in contact with the digitizer and including an organic material; and
a second layer on the first layer and including an inorganic material.

3. The electronic device of claim 2, wherein the digitizer includes:
a lower layer;
first loop coils on the lower layer;
an upper layer on the lower layer and covering the first loop coils;
second loop coils on the upper layer;
connection lines connected to corresponding ones of the first loop coils and the second loop coils, respectively; and
sensing pads connected to corresponding ones of the connection lines, respectively,
wherein the sensing pads are connected to the second driver chip and exposed from the portion of the base layer overlapping the second non-bending region.

4. The electronic device of claim 3, wherein
the lower layer includes a first organic layer and a first inorganic layer on the first organic layer, wherein the first loop coils are on the first inorganic layer, and
the upper layer includes a second organic layer covering the first inorganic layer and a second inorganic layer on the second organic layer, wherein the second loop coils are on the second inorganic layer.

5. The electronic device of claim 4, wherein
the first organic layer and the second organic layer include a material the same as a material of the first layer, and
the first inorganic layer and the second inorganic layer include a material the same as a material of the second layer.

6. The electronic device of claim 1, further comprising:
a panel protection layer including a base film including an organic material and a shield part including magnetic metal powder.

7. The electronic device of claim 6, wherein the shield part is on the base film.

8. The electronic device of claim 6, wherein the magnetic metal powder is within the base film.

9. The electronic device of claim 6,
wherein the first non-bending region of the display panel includes:
  a folding region which is foldable about an imaginary folding axis extending in the first direction; and
  non-folding regions which are spaced apart along the second direction with the folding region interposed therebetween,
wherein the electronic device further comprises a lower plate below the panel protection layer,
wherein the lower plate includes non-folding parts which overlap corresponding non-folding regions and a folding part which overlaps the folding region,
wherein the folding part is disposed between the non-folding parts,
wherein a plurality of holes is defined through the folding part of the lower plate to extend from top to bottom surfaces of the lower plate.

10. The electronic device of claim 9, further comprising:
an adhesion layer disposed between the panel protection layer and the lower plate,
wherein a groove is defined in a portion of the adhesion layer overlapping the folding part, wherein the groove is formed by removal of at least a portion of the adhesion layer.

11. The electronic device of claim 1, wherein, in a state where the bending region is bent, the first driver chip and the second driver chip overlap the first non-bending region.

12. The electronic device of claim 1, wherein the digitizer detects an external input using an electromagnetic resonance method.

13. The electronic device of claim 1, further comprising:
an input sensor on the display panel,
wherein the input sensor includes:
  at least one sensing insulation layer; and
  sensing electrodes which are insulated from each other,
wherein the input sensor detects an external input using a capacitive method.

14. The electronic device of claim 1, further comprising:
an upper film on the display panel,
wherein the upper film includes a synthetic resin.

15. The electronic device of claim 14, further comprising:
a window on the upper film,
wherein the window includes a thin glass substrate, a window protection layer on the thin glass substrate, and a functional layer on the window protection layer,
wherein the functional layer includes at least one selected from a hard coating layer, an anti-fingerprint layer, and an antireflection layer.

16. A method of fabricating an electronic device, the method comprising:
forming a lower layer on a work substrate;
forming first loop coils and connection lines on the lower layer, wherein the connection lines are connected to corresponding first loop coils;
forming an upper layer on the lower layer;
forming second loop coils on the upper layer, wherein the second loop coils are connected to corresponding connection lines through contact holes defined in the upper layer;
forming a base layer on the upper layer;
forming sensing pads on the base layer; and
forming pixels on a front surface of the base layer,
wherein the sensing pads are connected to corresponding connection lines through contact holes defined in the upper layer and the base layer,
wherein each of the lower layer, the upper layer, and the base layer includes:
  a first layer is an organic layer including an organic material; and
  a second layer is an inorganic layer including an inorganic material, wherein the second layer is disposed on the first layer, and
wherein the first layer of the base layer and the second layer of the upper layer are in contact with each other.

17. The method of claim 16, further comprising:
forming, on the base layer, a circuit layer including dielectric layers, transistors, and circuit lines connected to the transistors;
forming, on the circuit layer, a light-emitting element layer including light-emitting elements connected to the transistors; and
forming an encapsulation layer to cover the light-emitting element layer.

18. The method of claim 17, further comprising:
forming display pads on the base layer, wherein the display pads are exposed from at least one of the dielectric layers and connected to corresponding circuit lines.

19. The method of claim 18, further comprising:
connecting a first driver chip to the display pads; and
connecting a second driver chip to the sensing pads.

20. The method of claim 16, wherein the connection lines, the first loop coils, and the second loop coils are formed by one selected from a sputtering process, an electroless plating process, a trench process, and a transfer process.

* * * * *